US012663252B2

(12) United States Patent
Tsukiji

(10) Patent No.: US 12,663,252 B2
(45) Date of Patent: Jun. 23, 2026

(54) ESTIMATION APPARATUS, APPARATUS, ESTIMATION METHOD AND COMPUTER READABLE STORAGE MEDIUM

(71) Applicant: Asahi Kasei Microdevices Corporation, Tokyo (JP)

(72) Inventor: Hidekazu Tsukiji, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 144 days.

(21) Appl. No.: 18/444,766

(22) Filed: Feb. 19, 2024

(65) Prior Publication Data

US 2024/0328771 A1 Oct. 3, 2024

(30) Foreign Application Priority Data

Mar. 29, 2023 (JP) ................................ 2023-054039

(51) Int. Cl.
  *G01B 7/008* (2006.01)
  *G01B 7/30* (2006.01)
  *G01D 5/14* (2006.01)
(52) U.S. Cl.
  CPC .............. *G01B 7/008* (2013.01); *G01B 7/30* (2013.01); *G01D 5/145* (2013.01)
(58) Field of Classification Search
  CPC ........... G01B 7/008; G01B 7/30; G01D 5/145
  See application file for complete search history.

(56) References Cited

U.S. PATENT DOCUMENTS

| | | | |
|---|---|---|---|
| 6,356,741 B1 * | 3/2002 | Bilotti ................ | H03K 17/9517 |
| | | | 307/116 |
| 9,823,093 B2 | 11/2017 | Kauhaniemi | |
| 12,372,378 B2 * | 7/2025 | Tsukiji ................... | G01D 3/032 |
| 2002/0119802 A1 * | 8/2002 | Hijii .................... | H04M 1/0245 |
| | | | 455/575.3 |
| 2004/0056651 A1 | 3/2004 | Marietta Bersana | |
| 2019/0179446 A1 | 6/2019 | Kremin | |
| 2020/0116524 A1 | 4/2020 | Dupre La Tour | |

FOREIGN PATENT DOCUMENTS

| | | |
|---|---|---|
| JP | H05250475 A | 9/1993 |
| JP | 2006010461 A | 1/2006 |
| JP | 2012090028 A | 5/2012 |
| JP | 2018128350 A | 8/2018 |
| JP | 2022122245 A | 8/2022 |

* cited by examiner

*Primary Examiner* — Reena Aurora

(57) ABSTRACT

Provided is an estimation apparatus for estimating a position and an attitude of a second portion with respect to a first portion in an apparatus including the first portion, the second portion, a movable mechanism which changes at least one of the position or the attitude of the second portion with respect to the first portion, at least one magnetic sensor provided in one of the first portion or the second portion, and a magnet section which is provided in another of the first portion or the second portion and which provides a magnetic field measured by the at least one magnetic sensor. The estimation apparatus includes an update unit which updates the reference information indicating a combination of measured values based on a correlation of measured values of the at least two components in the at least one direction measured by the at least one magnetic sensor.

12 Claims, 21 Drawing Sheets

10B

10A

11

12

X

Z

Y

10A

10A

10A 14    54    52

10B 14    54    52

Y

X

10B

ESTIMATION APPARATUS, APPARATUS, ESTIMATION METHOD AND COMPUTER READABLE STORAGE MEDIUM

The contents of the following patent application(s) are incorporated herein by reference: NO. 2023-054039 filed in JP on Mar. 29, 2023.

BACKGROUND

1. Technical Field

The present invention relates to an estimation apparatus, an apparatus, an estimation method, and a computer readable storage medium.

2. Related Art

Patent Document 1 describes "an opening and closing terminal which allows, based on a varied distance between a magnet and a magnetic sensor according to an angle of a hinge portion, a detection of the angle of the hinge portion by using the magnetic sensor".

LIST OF CITED REFERENCES

Patent Document

Patent Document 1: Specification of U.S. Pat. No. 9,823,093

DESCRIPTION OF EXEMPLARY EMBODIMENTS

Hereinafter, the present invention will be described through embodiments of the invention. However, the following embodiments are not for limiting the invention according to the claims. In addition, not all of the combinations of features described in the embodiments are imperative to the solving means of the invention.

Figure 1A:
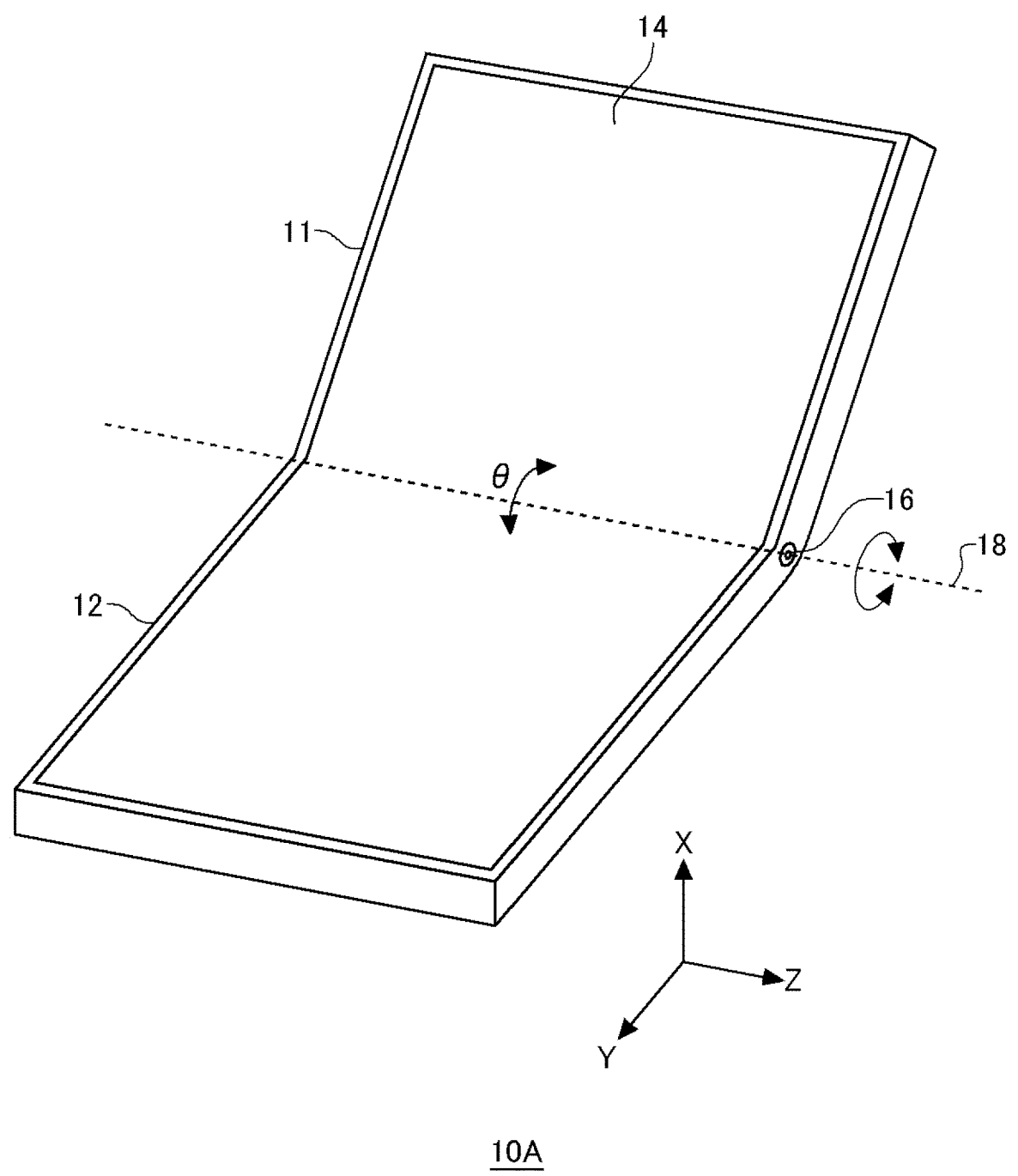
FIG. 1A is an example of an external appearance perspective view of an apparatus 10A.

FIG. 1A is an example of an external appearance perspective view of an apparatus 10A. The apparatus 10A is a collapsible terminal, and is a mobile terminal such as, for example, a smartphone, a mobile phone, a tablet, a laptop, and a small computer. In the drawing, an example is illustrated in which the apparatus 10A is a so-called foldable smartphone. The apparatus 10A includes a first portion 11, a second portion 12, a display 14, and a hinge mechanism 16.

The display 14 is a foldable display. For example, the display 14 is an organic ELL (OLED) display.

The first portion 11 and the second portion 12 are parts of a housing of the apparatus 10A. The first portion 11 and the second portion 12 may be integrally configured. The hinge mechanism 16 couples the first portion 11 and the second portion 12 so as to be collapsible. The hinge mechanism 16 may be a part of the first portion 11 or the second portion 12. As an example, in the apparatus 10A of the present embodiment, the hinge mechanism 16 is a part of the second portion 12.

In the present embodiment, a description will be provided where a right-handed (positive-oriented) orthogonal coordinate system is set. A Z axis of the orthogonal coordinate system is taken in a direction of a rotational axis 18 of the hinge mechanism 16. For example, a Y axis is taken in a direction in which the first portion 11 extends from the hinge mechanism 16 in a closed state of a foldable smartphone illustrated in FIG. 1B. In this case, the first portion 11 rotates such that an angle θ that is an angle formed with the second portion 12 is varied from 0 degrees to 180 degrees. It is noted however that a manner in which the Y axis is taken and a rotationally moving side out of the first portion 11 and the second portion 12 are exemplifications, and are not limited to this. As long as the angle θ formed between the first portion 11 and the second portion 12 is allowed to be varied, the second portion 12 may be rotationally moving with respect to the first portion 11.

In this manner, in the present embodiment, the first portion 11 varies the attitude with respect to the second portion 12 by a rotation via the hinge mechanism 16. That is, the hinge mechanism 16 is an example of a "movable mechanism" which changes the attitude of the second portion 12 with respect to the first portion 11.

Figure 1B:
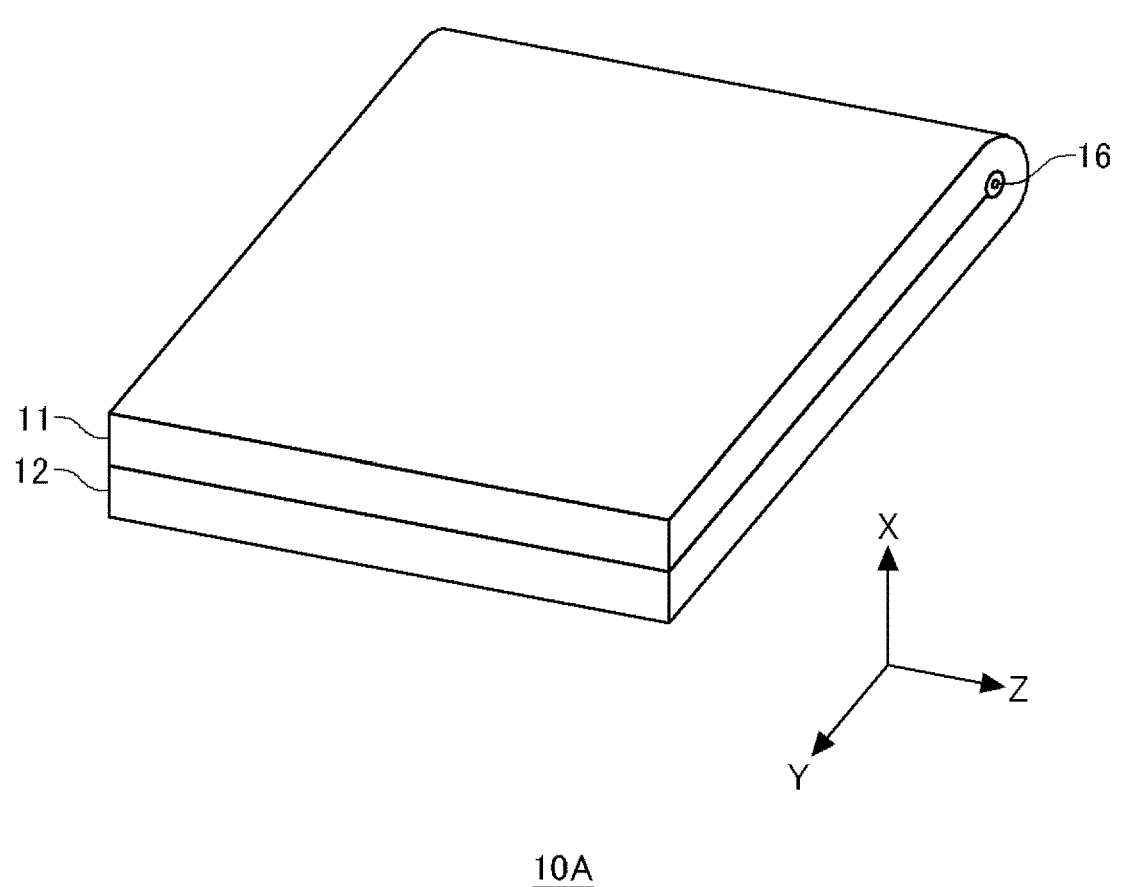
FIG. 1B is an example of the external appearance perspective view of the apparatus 10A in a closed state.

FIG. 1B is an example of the external appearance perspective view of the apparatus 10A in the closed state. A state in which the foldable smartphone is in the "closed state" refers to a case where, as illustrated in the drawing, the angle θ formed between the first portion 11 and the second portion 12 is 0 degrees, and is in a state in which the first portion 11 is closed with respect to the second portion 12.

Herein, in the present embodiment, a state in which the apparatus 10A is in the "closed state" refers to a state in which the second portion 12 is in a "first attitude" with respect to the first portion 11. It is noted however that a manner in which the "first attitude" in the present embodiment is defined is an exemplification, and a different attitude of the second portion 12 with respect to the first portion 11 may be defined as the "first attitude".

Figure 1C:
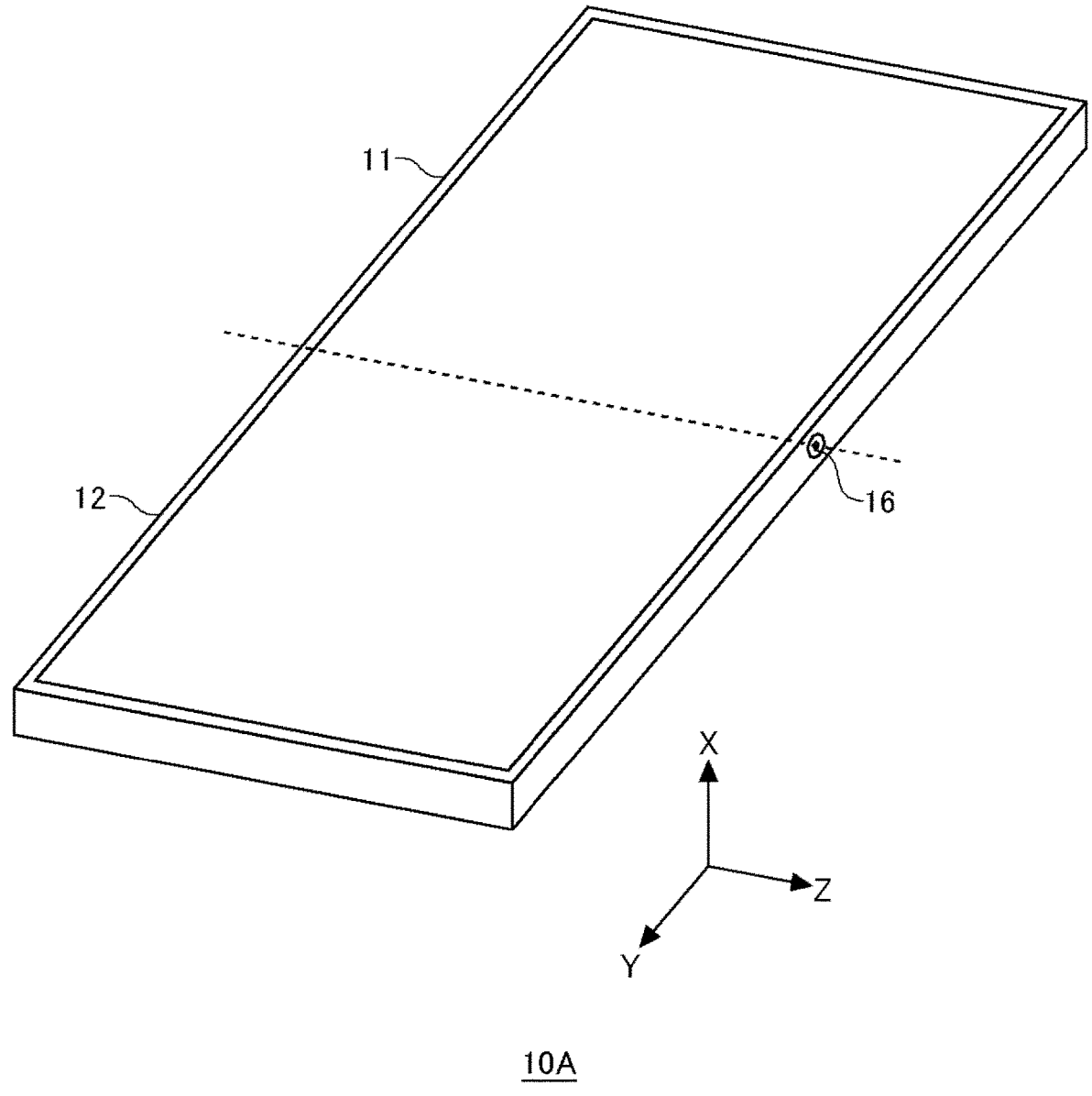
FIG. 1C is an example of the external appearance perspective view of the apparatus 10A in an open state.

FIG. 1C is an example of the external appearance perspective view of the apparatus 10A in an open state. A state in which the apparatus 10A is in the "open state" refers to a case where, as illustrated in the drawing, the angle θ formed between the first portion 11 and the second portion 12 is in a state of 180 degrees, and refers to a state in which the first portion 11 is not collapsed with respect to the second portion 12.

Herein, in the present embodiment, a state in which the apparatus 10A is in the "open state" refers to a state in which the second portion 12 is in a "second attitude" with respect to the first portion 11. It is noted however that a manner in which the "second attitude" in the present embodiment is defined is an exemplification, and a different attitude of the second portion 12 with respect to the first portion 11 may be defined as the "second attitude".

In this manner, the hinge mechanism 16 of the present embodiment allows an operation for causing the apparatus 10A to change from the "closed state" to the "open state", that is, from the "first attitude" to the "second attitude" (which is an example of a "first operation"). In addition, the hinge mechanism 16 allows an operation for causing the apparatus 10A to change from the "open state" to the "closed state", that is, from the "second attitude" to the "first attitude" (which is an example of a "second operation").

Figure 2:
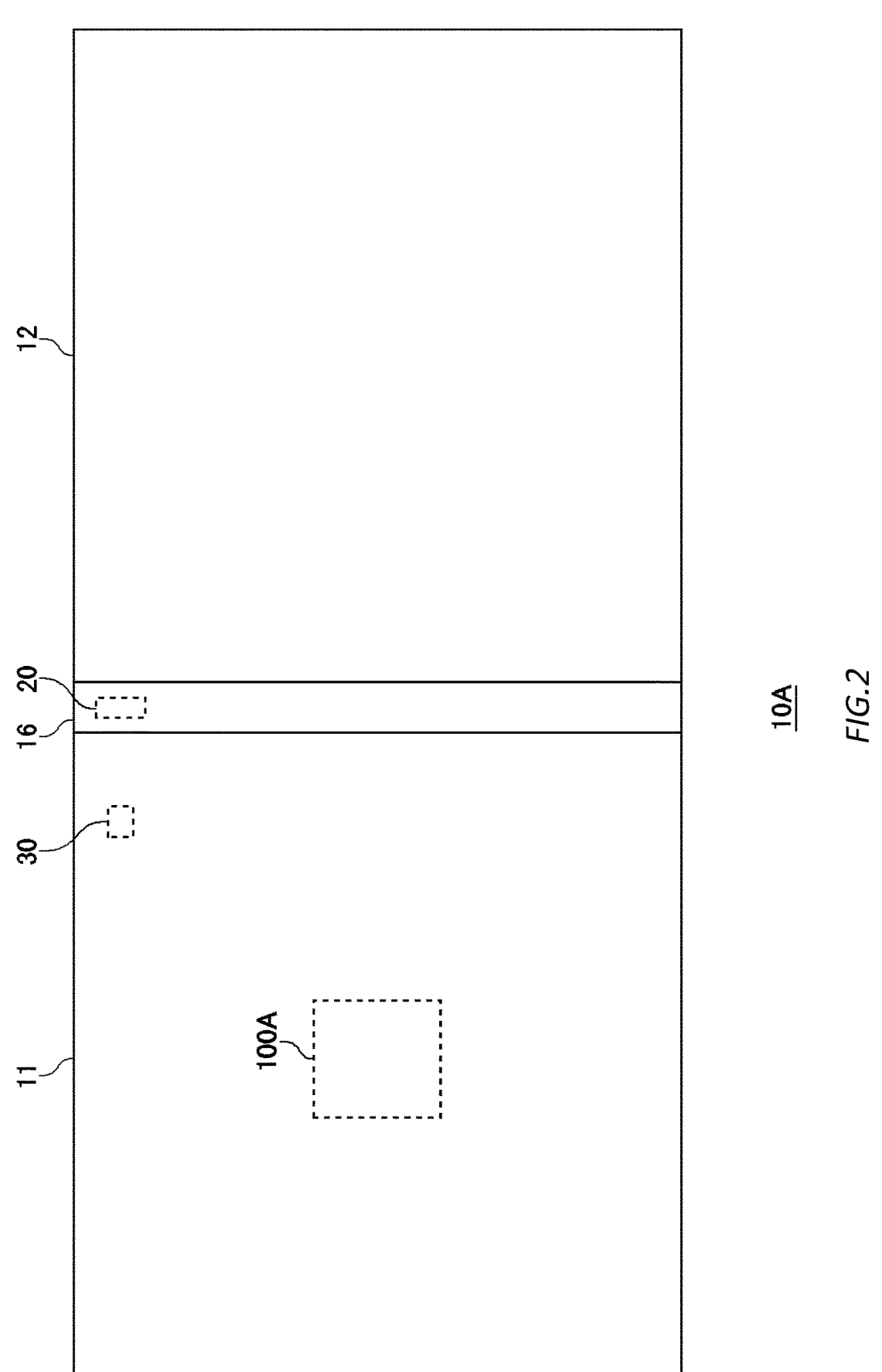
FIG. 2 is an example of a schematic top view in the apparatus 10A.

FIG. 2 is an example of a schematic top view of the apparatus 10A in the open state. The apparatus 10A includes a magnet section 20, a magnetic sensor 30, and an estimation apparatus 100A. As will be described below in detail, by using the magnet section 20 and the magnetic sensor 30, the apparatus 10A of the present embodiment can accurately estimate the angle θ formed between the first portion 11 and the second portion 12.

The magnet section 20 includes a magnet which generates a magnetic field which is varied according to the angle between the first portion 11 and the second portion 12. With this configuration, the magnet section 20 provides the magnetic field to be measured by the magnetic sensor 30. The magnet section 20 of the present embodiment is provided in the hinge mechanism 16 configuring a part of the second portion out of the first portion 11 and the second portion 12, and the magnetic sensor 30 is provided in the first portion 11 which does not configure the hinge mechanism 16 out of the first portion 11 and the second portion 12.

It is noted however that it suffices when the magnet section 20 is provided in a position where a magnetic flux density according to an angle can be detected by a relative position with respect to the magnetic sensor 30. The magnet section 20 may be provided in one of the first portion 11 or the second portion 12, and the magnetic sensor 30 may be provided in another of the first portion 11 or the second portion 12. Accordingly, in an example in which the magnet section 20 is provided in the first portion 11, the magnetic sensor 30 may be provided in the second portion 12.

The magnetic sensor 30 measures a magnetic field (or a magnetic flux density; hereinafter this may be simply referred to as a magnetic field including a meaning of the magnetic flux density) at a certain time point according to the angle between the first portion 11 and the second portion 12. The magnetic sensor 30 outputs a voltage or a current according to a measured value of the magnetic flux density. For example, the magnetic sensor 30 is a Hall element. The time point at which the magnetic flux density is measured by the magnetic sensor 30 is an example of a "first time point".

In the apparatus 10A, at least one magnetic sensor 30 is provided. In particular, an example will be hereinafter described in which magnetic flux densities in a plurality of different directions are measured by the single magnetic sensor 30. However, in the apparatus 10A, the number of magnetic sensors 30 to be provided may be two or more as desired.

The estimation apparatus 100A estimates the angle θ based on the measured value of the magnetic flux density sensed by the magnetic sensor 30, and also updates the reference information for estimating the angle θ. Note that the estimation of the angle θ is an example of an estimation of the attitude that is varied due to a rotational motion through the hinge mechanism 16 of the second portion 12 with respect to the first portion 11.

The apparatus 10A performs a predetermined operation based on the angle estimated by the estimation apparatus 100A. The apparatus 10A may display different images in a display section of the first portion 11 and a display section of the second portion 12 based on the angle estimated by the estimation apparatus 100A. For example, when the angle estimated by the estimation apparatus 100A falls within a predetermined angle range from 90 degrees to 120 degrees or the like, the apparatus 10A may display an operational functionality such as a keyboard in the display section of the second portion 12, and may display a display functionality for displaying an image such as, for example, a document or a video, according to content of an operation by the operational functionality in the display section of the first portion 11. Hereinafter, with reference to FIG. 3, an internal configuration and the functionality of the estimation apparatus 100A will be further described.

Figure 3:
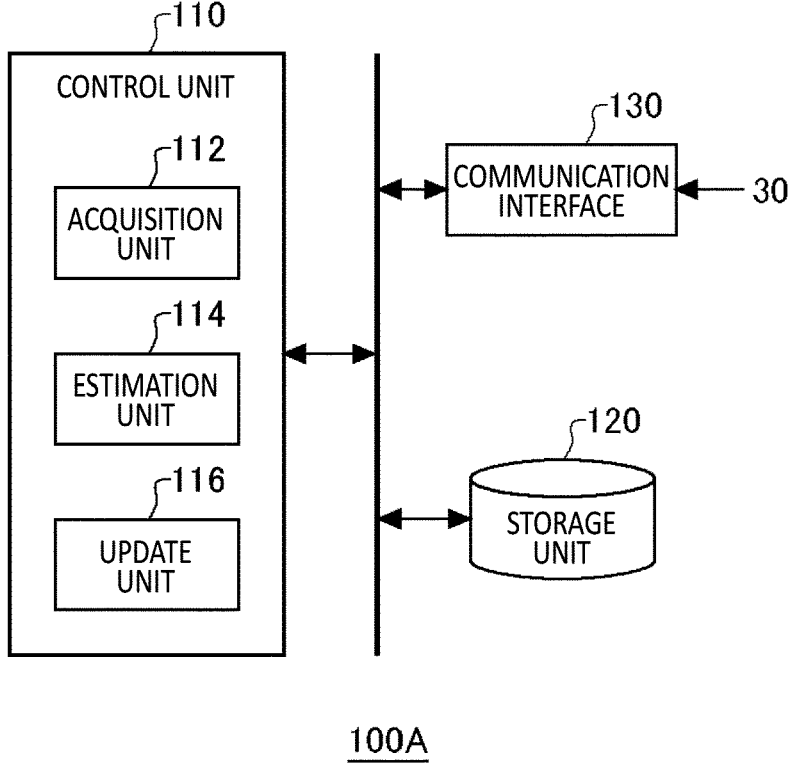
FIG. 3 illustrates an example of a configuration of an estimation apparatus 100A.

FIG. 3 illustrates an example of a configuration of the estimation apparatus 100A. The estimation apparatus 100A includes a control unit 110, a storage unit 120, and a communication interface 130.

The control unit 110 estimates the angle θ corresponding to the measured value based on the measured value of the magnetic flux density by the magnetic sensor 30 which is received from the communication interface 130 and reference information stored in the storage unit 120, and performs control so as to cause the apparatus 10A to function based on the estimated angle. Furthermore, the control unit 110 updates the reference information, and controls the storage unit 120 such that the updated reference information is stored in the storage unit 120.

The storage unit 120 stores the reference information in which a combination of measured values of each component of the magnetic flux density detected by the magnetic sensor 30 is associated with the angle between the first portion 11 and the second portion 12. As an example, the reference information is a figure of a hysteresis curve drawn by at least two components among a component in an X axis direction, a component in an Y axis direction, and a component in a Z axis direction of the magnetic flux density (hereinafter, which may be respectively referred to as an X component, a Y component, and a Z component).

The communication interface 130 receives the measured value of the magnetic flux density measured by the magnetic sensor 30 via a signal line from the magnetic sensor 30. The estimation apparatus 100A performs the estimation of the angle θ of the second portion 12 with respect to the first portion 11 based on the X component, the Y component, and the Z component of the magnetic flux density, and the reference information. Hereinafter, with reference to FIG. 4A to FIG. 7, a principle for the control unit 110 to perform the estimation of the angle θ will be described, and subsequently, a description of an internal configuration and a functionality of the control unit 110 will be provided.

Figure 4A:
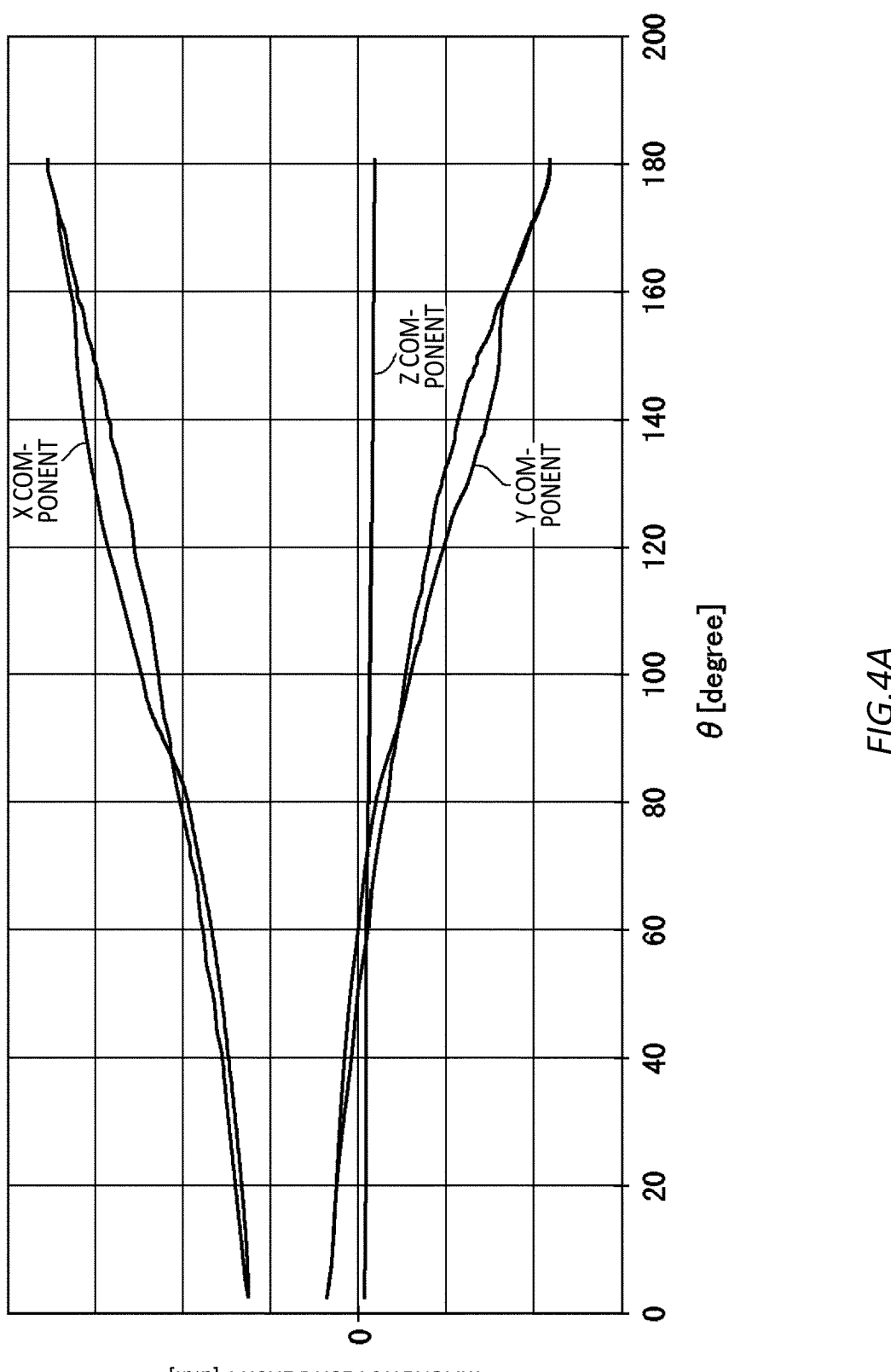
FIG. 4A illustrates an example of a magnetic flux density according to an angle $\theta$ between a first portion 11 and a second portion 12 which is detected by a magnetic sensor 30.

FIG. 4A illustrates an example of the magnetic flux density according to the angle θ between the first portion 11 and the second portion 12 which is detected by the magnetic sensor 30. The drawing illustrates each of the X component, the Y component, and the Z component in an XYZ coordinate system of the magnetic flux density in a case of transition of the apparatus 10A from the closed state to the open state and transition from the open state to the closed state again (that is, a case of reciprocating once from the closed state to the closed state via the open state). Note that in the present specification, each graph below is to exemplify and describe components of each magnetic flux density with respect to the angle, or a relationship between components of each magnetic flux density and a shape or the like of a figure indicating the relationship. Accordingly, each component of the magnetic flux density in each graph is indicated as a value in an arbitrary unit (a.u.). This graph can be used as the "reference information" indicating a relationship between the angle θ and the X component and the Y component of the magnetic flux density.

In the drawing, the X component, the Y component, and the Z component of the magnetic flux density draw almost closed curves. However, the curve drawn by the X component of the magnetic flux density during the transition from the closed state to the open state and the curve drawn by the X component of the magnetic flux density during the transition from the open state to the closed state draw different trajectories due to an impact of a magnetic hysteresis to reach ends of the curves. For example, the impact of the magnetic hysteresis appears in each component of the X component, the Y component, and the Z component of the magnetic flux density, but with regard to an appearing manner in each component of the impact of the magnetic hysteresis, the impact appears in different magnitudes based on relative positions of the magnet section 20 and the magnetic sensor 30. Note that during opening and closing operations of the apparatus 10A, depending on how much force is applied to the hinge, in the apparatus 10A, a positional relationship between the magnet section 20 and the magnetic sensor 30 may be slightly varied. This impact may also appear as a hysteresis in the magnetic flux density measured by the magnetic sensor 30.

Figure 4B:
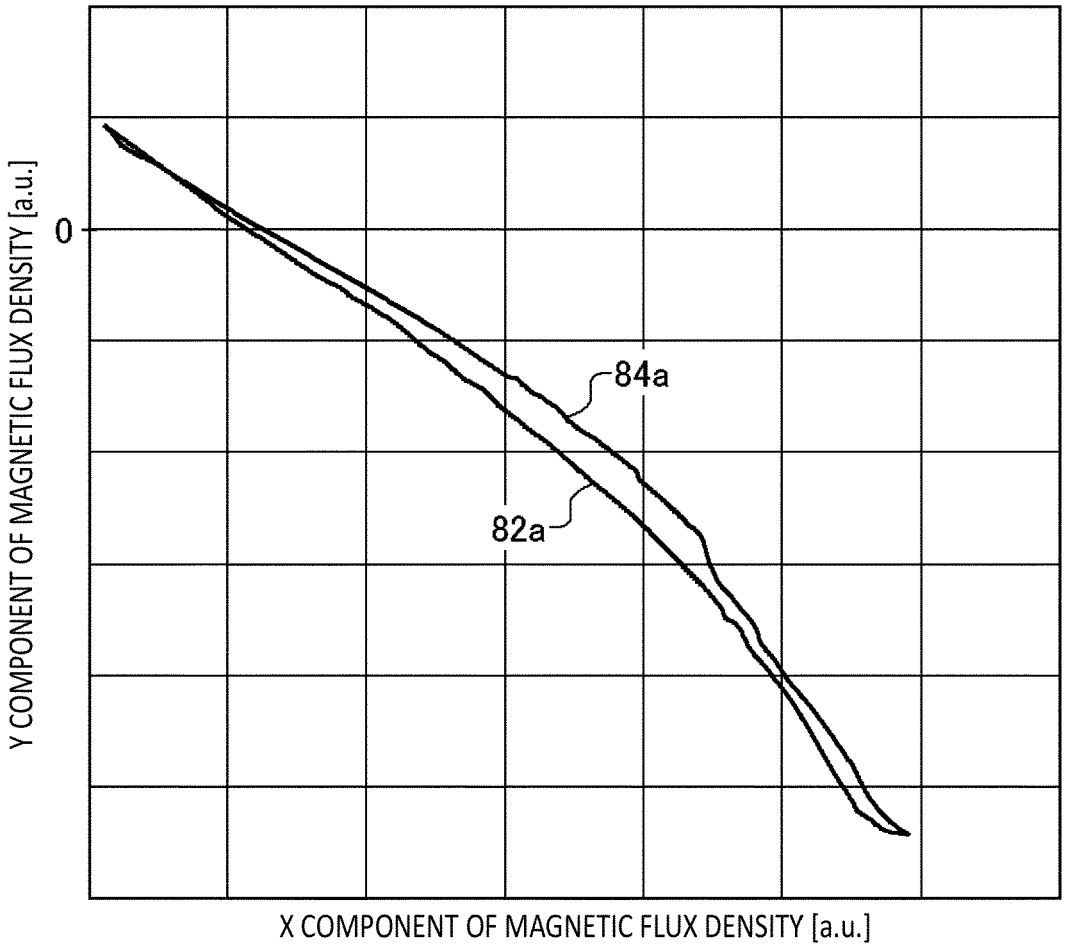
FIG. 4B is a graph illustrating an X component and a Y component of a magnetic field illustrated in FIG. 4A.

FIG. 4B is a graph illustrating the X component and the Y component of the magnetic field illustrated in FIG. 4A. To illustrate the X component and the Y component of the magnetic flux density in the drawing, a figure of a hysteresis curve of an almost closed curve can be drawn in which the angle θ is set as a parameter which does not directly appear in the drawing.

In the drawing, in particular, during the first operation for the transition by the apparatus 10A from the closed state to the open state, a curve obtained by linking the X components and the Y components of the measured values of the magnetic sensor 30 is illustrated as a curve 82a. On the other hand, subsequently, during the second operation for the transition by the apparatus 10A from the open state to the closed state, a curve obtained by linking the X components and the Y components of the measured values of the magnetic sensor 30 is illustrated as a curve 84a. Due to the impact of the magnetic hysteresis, these curves 82a and 84a take different trajectories to reach coordinates that approximately match at the ends.

In order to draw such a hysteresis curve, components of the magnetic flux density in two different axial directions in the XYZ coordinate system are selected. As in the present embodiment, when the Z axis is taken in substantially parallel to the rotational axis 18 of the second portion 12 with respect to the first portion 11, for example, components in the directions of the two axes other than the Z axis, that is, the X component and the Y component may be used. It is noted however that a manner of selecting the two components is not limited to this example, and another manner of selecting, that is, the Y component and the Z component or the Z component and the X component may be used.

A position on the hysteresis curve depends on the angle θ that is a parameter. When the X component and the Y component of the measured values of the magnetic flux density are acquired, the estimation apparatus 100A can estimate the angle θ between the first portion 11 and the second portion 12 by identifying the position on the hysteresis curve of the measured values and deriving the angle θ corresponding to the position.

Figure 5A:
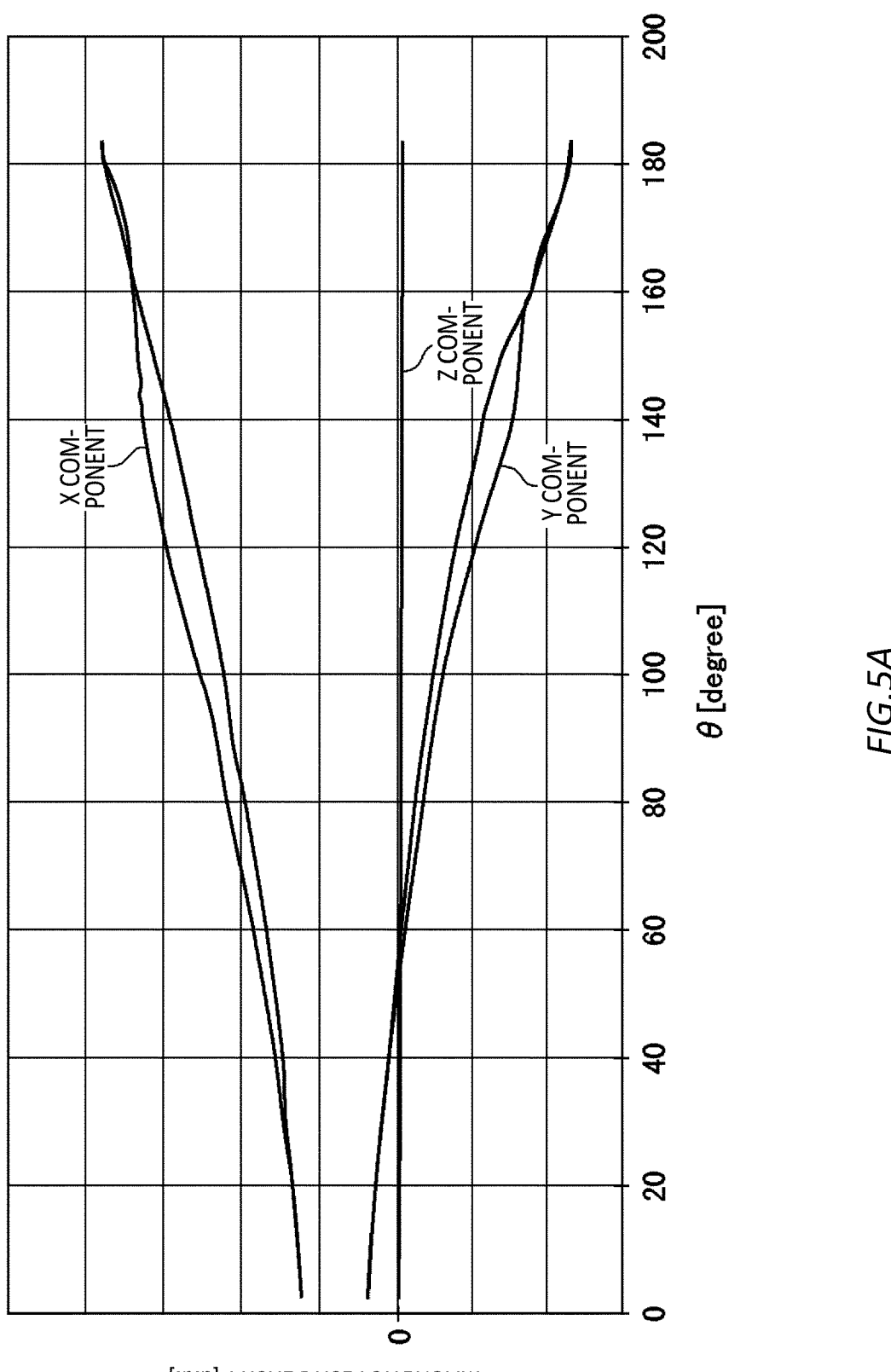
FIG. 5A illustrates another example of the magnetic flux density according to the angle $\theta$ between the first portion 11 and the second portion 12 which is detected by the magnetic sensor 30.

FIG. 5A illustrates another example of the magnetic flux density according to the angle θ between the first portion 11 and the second portion 12 which is detected by the magnetic sensor 30. As illustrated in the drawing, when attempts of opening and closing are different due to a detection error of the sensor, a magnetic field of an external environment, an impact from the magnetic hysteresis, or the like, an angular component of the magnetic flux density may draw a different trajectory.

In curves in which a horizontal axis represents the angle θ and a vertical axis represents the magnetic flux density (or the magnetic field), for example, several differences are found when FIG. 4A is compared with FIG. 5A. In the curves drawing the X component of the magnetic flux density of FIG. 4A, at the angle θ of around 85 degrees, the curve drawn during the transition from the closed state to the open state intersects with the curve drawn during the transition from the open state to the closed state. On the other hand, in the curves drawing the X component of the magnetic flux density of FIG. 5A, the curves drawing the almost closed curve do not intersect at points other than the end points.

Furthermore, in the curves drawing the Y component of the magnetic flux density of FIG. 4A, at the angle θ of around 90 degrees, the curve drawn during the transition from the closed state to the open state intersects with the curve drawn during the transition from the open state to the closed state. In the curves drawing the Y component of the magnetic flux density of FIG. 5A, at the angle θ of around 90 degrees, both curves do not intersect with each other.

In this manner, when the attempts of opening and closing are different, the curve drawing the angle θ and the magnetic flux density may have a varied geometric feature. However, as will be described below with reference to FIG. 4B and FIG. 5B, when expansion or reduction and parallel movement are performed on a figure of the hysteresis curve to be drawn among each component of the magnetic flux density, geometric features of the X component and the Y component of the magnetic flux density approximately match.

Figure 5B:
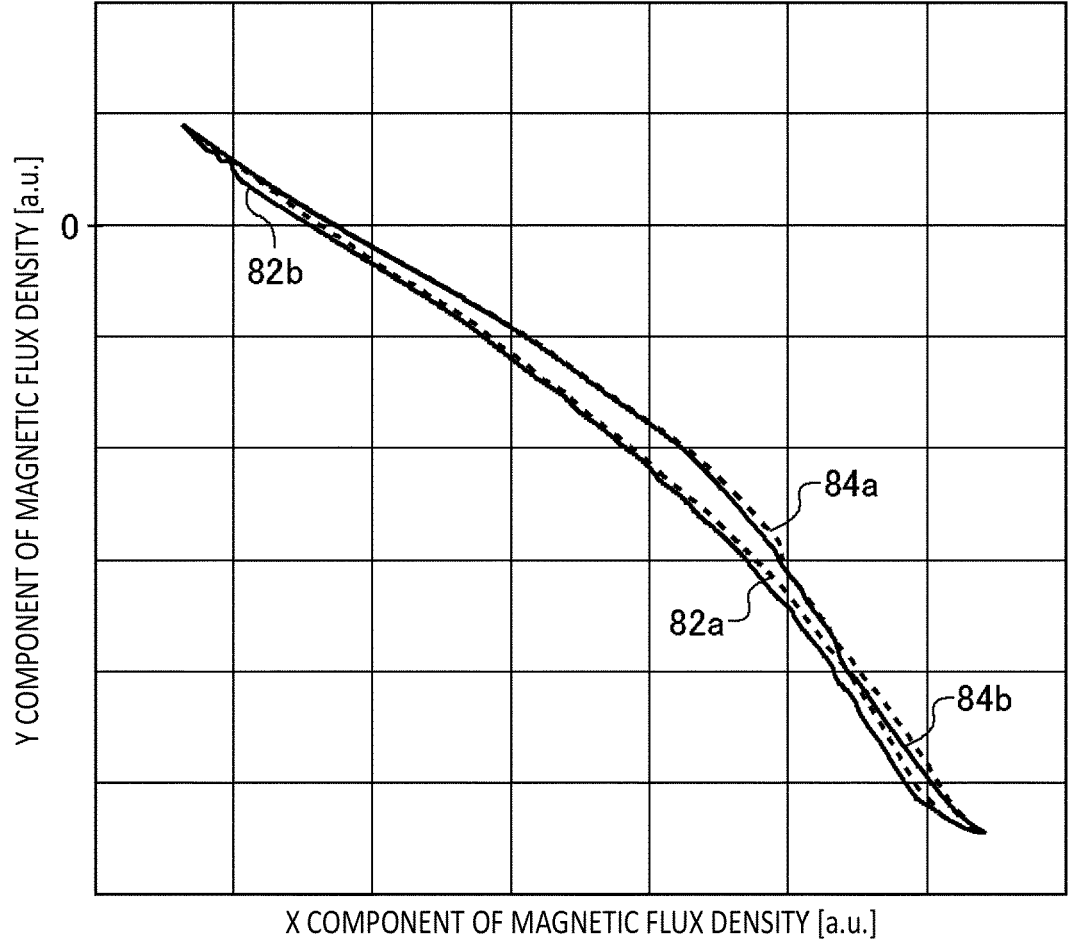
FIG. 5B is a diagram in which curves 82b and 84b obtained in such a manner that curves drawn by an X component and a Y component of a magnetic field illustrated in FIG. 5A are expanded or reduced and moved in parallel, and curves 82a and 84a illustrated in FIG. 4B are arranged side by side.

FIG. 5B is a diagram in which curves 82b and 84b obtained in such a manner that curves drawn by the X component and the Y component of the magnetic field illustrated in FIG. 5A are expanded or reduced and moved in parallel, and the curves 82a and 84a illustrated in FIG. 4B are arranged side by side. In the present specification, hereinafter, a combination of the curve 82a linking the measured values in the first operation and the curve 82b obtained in such a manner that the curve linking the measured values is expanded or reduced and moved in parallel, and the curve 84a linking the measured values in the second operation and the curve 84b obtained in such a manner that the curve linking the measured values is expanded or reduced and moved in parallel may be collectively referred to as curves 82 and 84.

As illustrated in the drawing, each of the curves 82a and 82b and the curves 84a and 84b has some deviation but draws an approximately matching outline in many geometric features including a feature on whether the curves 82a and 84a or the curves 82b and 84b intersect with each other, and the like. In this manner, even when the X component and the Y component of the magnetic flux density component experience the detection error of the sensor, the variation in the external environment, the impact from the hysteresis, or the like every attempt of opening and closing, the curves drawn by the X component and the Y component of the magnetic flux density have approximately matching outlines by being expanded or reduced and moved in parallel.

Accordingly, by using such property that shapes of the hysteresis curves (the curves 82 and 84) drawn by the X component and the Y component of the magnetic flux density are stable, with respect to the hysteresis curves (correlation) of the X component and the Y component of the magnetic flux density, an impact which is caused by variation of a magnetic field environment such as magnetization and applied to the magnetic sensor 30 can be evaluated. The impact from the magnetization or the like on this hysteresis curve is evaluated to update the reference information indicating the relationship between the angle θ and the X component and the Y component of the magnetic flux density in order to cancel the impact such as the magnetization. By estimating the angle θ by using the reference information after the update, even when a magnetic field in a surrounding of the apparatus 10A is varied, it is possible to suppress a reduction of an accuracy on the estimation of the position of the magnet section 20 with respect to the magnetic sensor 30. Note that in the present embodiment, the X axis direction is an example of a "first direction", and the Y axis direction is an example of a "second direction". In this manner, in the present embodiment, the correlation of the X component and the Y component of the magnetic flux density is represented by a figure indicated by a set of coordinate values corresponding to the attitude of the second portion 12 with respect to the first portion 11 indicated by the combination of the measured value of the X component and the measured value of the Y component on a coordinate system in which a first axis represents the measured value of the component in the first direction which is measured by the magnetic sensor 30 and a second axis represents the measured value of the component in the second direction measured by the magnetic sensor 30.

In the present embodiment, as the components of the magnetic flux density to be used for the estimation of the angle θ of the estimation apparatus 100A, the X component and the Y component that are components other than the Z axis component substantially parallel to the rotational axis 18 of the hinge mechanism 16 are used. In such a case, as illustrated in the drawing, the hysteresis curve may draw an almost closed curve linking end points of the two curves 82 and 84.

In such a case, the correlation of the X component and the Y component of the magnetic flux density includes a "first combination group" (equivalent to a combination group corresponding to one curve out of the two curves of the hysteresis curves) of the measured values of the X component and the measured values of the Y component which are measured by the magnetic sensor 30 according to the angle θ of the second portion 12 with respect to the first portion 11 in the first operation of the apparatus 10A. Furthermore, the correlation includes a "second combination group" (equivalent to a combination group corresponding to another curve out of the two curves of the hysteresis curves) of the measured values of the X component and the measured values of the Y component which are measured by the magnetic sensor 30 according to the angle θ of the second portion 12 with respect to the first portion 11 in the second operation. The one curve 82 is an example of a "first line" corresponding to the first combination group. The another curve 84 is an example of a "second line" corresponding to the second combination group. That is, the figure of the hysteresis curves 82 and 84 indicating the correlation include the first line corresponding to the first combination group and the second line corresponding to the second combination group.

The hysteresis curve drawn by the combination of the X component and the Y component of the magnetic flux density in which the X component and the Y component of the magnetic flux density described above are set as coordinate axes is a curve having an angle as a parameter, and a position on the hysteresis curve and the angle θ have a correspondence relationship. That is, due to the match of the outlines of the mutual curves with different opening and closing attempts, the angle θ formed between the first portion 11 and the second portion 12 also indicates an approximately matching value at the measurement positions which approximately match with each other between the curves with the different opening and closing attempts.

The estimation apparatus 100A of the present embodiment uses a diagram illustrated in FIG. 4A or FIG. 5A as the reference information of the angle θ, and uses the hysteresis curve of FIG. 4B or FIG. 5B as the diagram illustrating the correlation of each component of the magnetic flux density. However, in another embodiment, the estimation apparatus 100A may use the curves 82*a* and 84*a* as the reference information of the angle θ.

Figure 6:
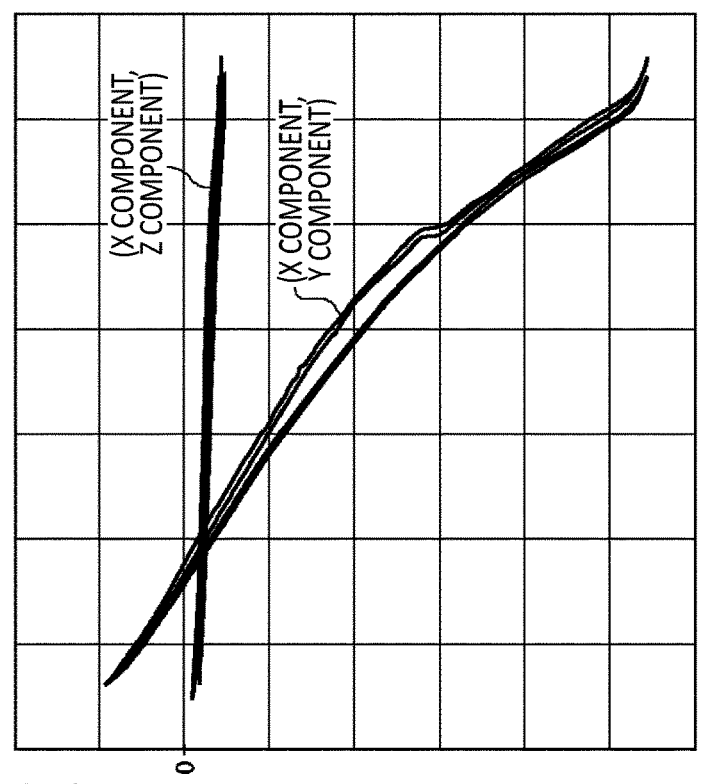
FIG. 6 represents an example of variation of a hysteresis curve when a magnet section 20 and the magnetic sensor 30 experience an impact of magnetization by an external magnetic field.
Figure 6:
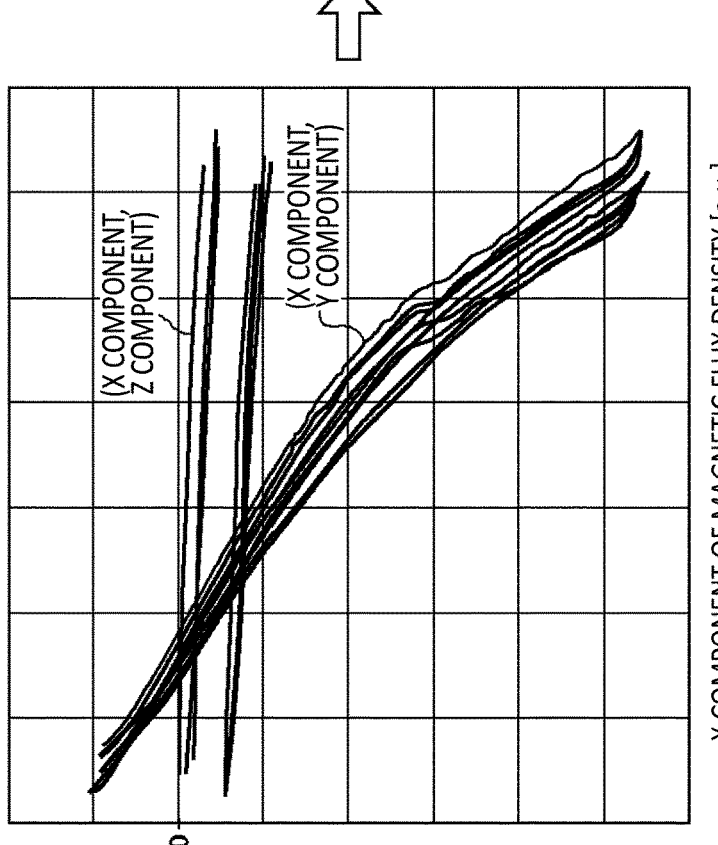

FIG. 6 represents an example of variation of the hysteresis curve when the magnet section 20 and the magnetic sensor 30 experience an impact of magnetization by an external magnetic field. Specifically, a relative positional relationship between the magnet section 20 and the magnetic sensor 30 is varied to approximate a state in which the hysteresis curve upon opening and closing of the second portion 12 with respect to the first portion 11 gradually experiences the impact of magnetic induction (magnetization) by an external factor.

In the drawing, a graph is illustrated in which a horizontal axis represents the measured value of the X component of the magnetic flux density measured by the magnetic sensor 30 and a vertical axis represents the Y component and the Z component of the magnetic flux density. A diagram on a left-hand side illustrates figures drawn by curves linking a combination of the measured values of the X component and the Y component and a combination of the measured values of the X component and the Z component. On the other hand, a diagram on a right-hand side illustrates curves obtained in such a manner that the curves drawn by the combination of the measured values of the X component and the Y component and the combination of the measured values of the X component and the Z component are expanded or reduced and moved in parallel.

In accordance with the diagram on the right-hand side, it is read that any of the curves drawn by the combination of the measured values of the X component and the Y component and the combination of the measured values of the X component and the Z component approximately matches after the curve is expanded or reduced and moved in parallel. In this manner, even when the impact of magnetic induction (magnetization) is experienced due to the external factor, the curve drawn by the combination of the measured values of the X component and the Y component and the curve drawn by the combination of the measured values of the X component and the Z component turn into the figures that approximately match by performing the expansion or the reduction and the parallel movement on the curve.

In this manner, it is further illustrated that the figures drawn by the two coordinate axis components of the magnetic flux density have stability against the detection error of the sensor, the variation in the external environment, the impact from the hysteresis, or the like. A reason for the geometric stability of the figure is that a figure is drawn in a coordinate system in which the angle θ is set as the parameter and the two coordinate axis components of the magnetic flux density are set as the axes instead of drawing a figure in which the angle θ is set as the coordinate axis.

Here, with reference to FIG. 3 again, the internal configuration and the functionality of the control unit 110 will be described. The control unit 110 estimates the angle θ by using the figures drawn by the two coordinate axis components of the magnetic flux density as the reference information. The control unit 110 includes an acquisition unit 112, an estimation unit 114, and an update unit 116.

The acquisition unit 112 receives a measured value of a magnetic flux density (or a magnetic field) measured by the magnetic sensor 30 from the communication interface 130, and acquires reference information from the storage unit 120. The acquisition unit 112 transmits the acquired measured value of the magnetic sensor 30 and the reference information to the estimation unit 114.

The estimation unit 114 estimates, based on a measured value of at least one component in at least one direction of the magnetic flux density which is measured at a certain time point by the magnetic sensor 30 and reference information indicating a measured value of at least one component in the at least one direction measured by the magnetic sensor 30 according to the attitude of the second portion 12 with respect to the first portion 11, the angle θ indicating the attitude of the second portion 12 with respect to the first portion 11 at the certain time point.

The update unit 116 updates the reference information on a shape of a figure stored in the storage unit 120 (figure represented by the graph which indicates a relationship between the measured value of each component of the magnetic flux density and the angle θ formed by the second portion 12 with respect to the first portion 11) based on respective correlations between a plurality of measured values of the X component and a plurality of measured values of the Y component in the magnetic flux density (or the magnetic field) measured by the magnetic sensor 30. That is, the control unit 110 not only estimates the angle indicating the attitude of the second portion 12 with respect to the first portion 11, but also updates the reference information stored in the storage unit 120 by using the correlation of the plurality of measured values.

In particular, with respect to the X component and the Y component of the measured values of the magnetic flux density, the update unit 116 may perform alignment, by performing at least one of a) expansion or reduction or b) movement of the figure of the reference information on an XY coordinate system, onto coordinate values respectively indicated by the measured values of the X component and the Y component. The update unit 116 may update the reference information based on the figure on which at least one of this expansion or reduction or this movement has been performed.

As an example, the update unit 116 may perform the alignment by at least one of the expansion or the reduction or the movement of the figure to update the reference information based on the correlation which is set by the figure after the alignment is performed.

As another example, the update unit 116 may perform the alignment by at least one of the expansion or the reduction or the movement of the figure to update the reference information based on information of the shape of the figure before the alignment and a transformation parameter according to the alignment by the expansion or the reduction or the movement of the figure. The transformation parameter indicates at least one of a) an expansion rate or a reduction rate of the figure at a time when the alignment is performed or b) an amount of movement to the X axis direction and the Y axis direction. The update of the reference information includes an update of the transformation parameter.

In this case, the update unit 116 may perform the transformation of the alignment of the expansion or the reduction and the movement of figure by aligning the measured value to the original figure. Accordingly, the update unit 116 may update the reference information by performing a compensation according to the transformation parameter with regard to the X component and the Y component of the measured values of the magnetic flux density subjected to the estimation. The update unit 116 may update the reference information based on the shape of the figure and the transformation parameter for compensating the measured value subjected to the estimation. In accordance with any of these reference information too, the estimation unit 114 can estimate the angle $\theta$ of the second portion 12 with respect to the first portion 11 based on the combination of the X component and the Y component of the magnetic flux density and the reference information.

With this configuration, even when the figure drawn by the combination of the measured value of the X component and the measured value of the Y component of the magnetic flux density experiences the detection error of the sensor, the variation in the external environment, the impact from the hysteresis, or the like, at the time of the next measurement by the magnetic sensor 30, the estimation unit 114 is allowed to estimate the angle more accurately. That is, in order to perform the estimation of the more accurate angle $\theta$ at the time of a new measurement of the magnetic flux density (or the magnetic field) by the magnetic sensor 30 along with new opening and closing operations of the apparatus 10A, the control unit 110 can perform calibration of the reference information stored in the storage unit 120.

The update of the reference information in the update unit 116 may be performed based on the plurality of measured values of the X component and the plurality of measured values of the Y component during at least part of at least one of the operation for the apparatus 10A to reach the open state from the closed state (the first operation) or the operation for the apparatus 10A to reach the closed state from the open state (the second operation). That is, the update unit 116 may update the reference information indicating the measured values of the X component and the Y component with respect to the angle $\theta$ based on respective correlations between the plurality of measured values of the X component and the plurality of measured values of the Y component which are measured during the part of the first operation or the second operation.

Figure 7:
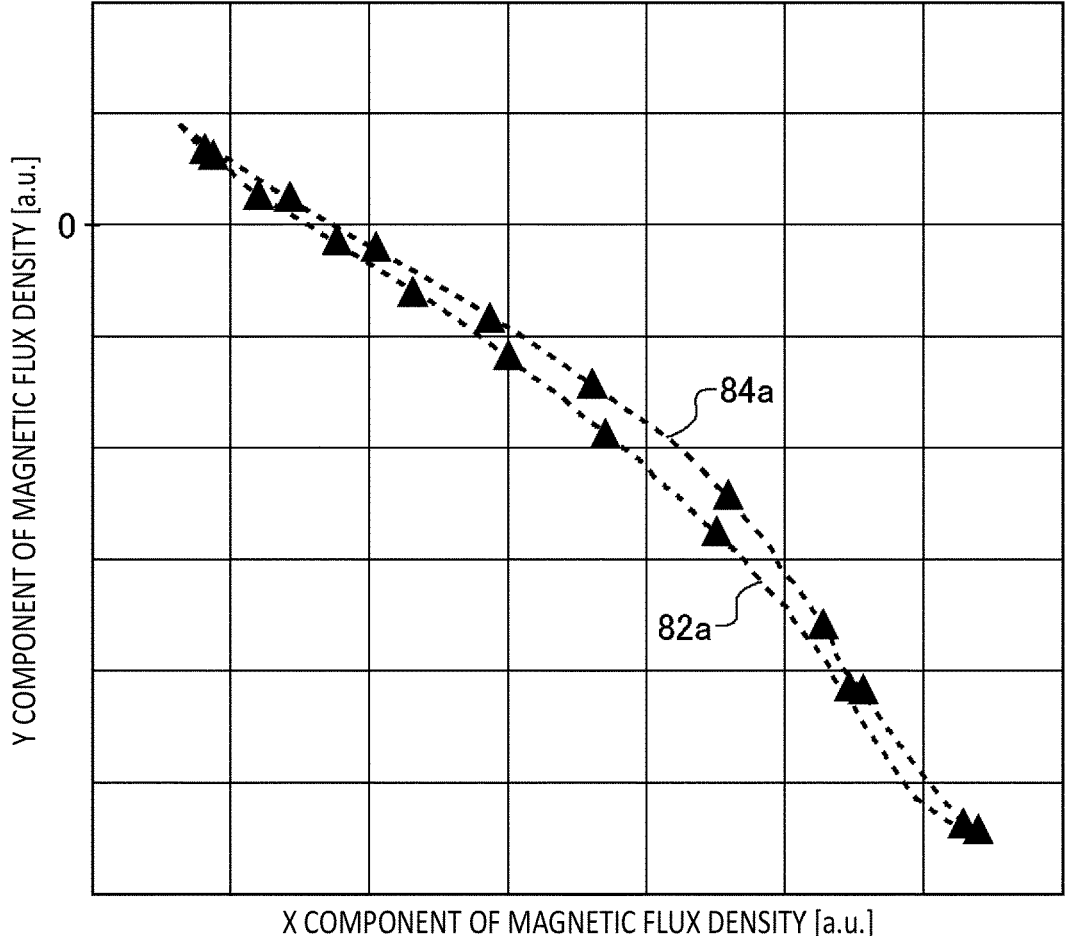
FIG. 7 illustrates an example of a diagram in which measured values are plotted on the hysteresis curve every 20 degrees.

FIG. 7 illustrates an example of a diagram in which measured values are plotted on the hysteresis curves (the curves 82a and 84a) every 20 degrees. The update unit 116 may set a feature point at which a figure of the hysteresis curve depicts a geometric and characteristic shape, and update the reference information based on the measured value measured by the magnetic sensor 30 at the feature point.

When it is determined that a predetermined condition indicating that the angle of the second portion 12 with respect to the first portion 11 is at the angle $\theta$ corresponding to the feature point is met, the estimation apparatus 100A may update the reference information based on the correlation of the measured value of the X component and the measured value corresponding to the Y component corresponding to each feature point. When the apparatus 10A includes an inertial measurement unit (IMU), if a measured value measured by the IMU meets a condition of the measured value at a time when the angle of the second portion 12 with respect to the first portion 11 reaches the angle $\theta$ corresponding to the feature point, the estimation apparatus 100A may determine that the predetermined condition is met.

Alternatively, when a user performs a predetermined instruction for the apparatus 10A, the estimation apparatus 100A may determine that the predetermined condition is met. When the apparatus 10A performs a predetermined operation in which it is possible to determine that the angle of the second portion 12 with respect to the first portion 11 reaches the angle $\theta$ corresponding to the feature point, the estimation apparatus 100A may determine that the predetermined condition is met. When it is sensed that a power source of a display is turned on or off, for example, the estimation apparatus 100A may determine that the predetermined condition is met.

It suffices when a number of feature points to be used to update the reference information is two points or more. For example, the estimation apparatus 100A calibrates the reference information by using the two points including a feature point corresponding to the closed state ($\theta=0$ degrees: the first attitude) and a feature point corresponding to the open state ($\theta=180$ degrees: the second attitude). In this manner, the update unit 116 may update the reference information based on the correlation of the measured values of the X component and the Y component which are measured by the magnetic sensor 30 when the second portion 12 is in the first attitude with respect to the first portion 11 or the correlation of the measured values of the X component and the Y component when the second portion 12 is in the second attitude with respect to the first portion 11.

Note that the feature point corresponding to the closed state in this example ($\theta=0$ degrees: the first attitude) and the feature point corresponding to the open state ($\theta=180$ Degrees: the second attitude) are the feature points that can be detected to a certain degree of accuracy by using, for example, the inertial measurement unit (IMU) as described above. The IMU is an apparatus which detects an angular velocity of the apparatus 10A centered on axes along the X axis, the Y axis, and the Z axis, and accelerations in the directions of the X axis, the Y axis, and the Z axis of the apparatus 10A. Accordingly, the IMU can detect switching of the first operation for the transition by the apparatus 10A from the closed state to the open state and the second operation for the transition from the open state to the closed state. In the apparatus 10A having the IMU described above, the feature point at the angle $\theta=0$ degrees and the feature point at the angle $\theta=180$ degrees may be used.

In addition, when at least two points of the feature points described above are used, a point at which the component of the X axis becomes maximum or minimum and a point at which the component of the Y axis becomes maximum or minimum may be used as the feature points. Values of the angles $\theta$ corresponding to these two feature points depend on relative positions of the magnet section 20 and the magnetic sensor 30. Accordingly, these two feature points do not necessarily match the point of $\theta=0$ degrees corresponding to the closed state and the point of $\theta=180$ degrees corresponding to the open state.

Extraction of the feature point and update of the reference information in the estimation apparatus 100A may be performed on entire trajectories of the figure of the hysteresis curve drawn by the X component and the Y component of the magnetic flux density, or may be performed on a part of the trajectory. For example, the estimation apparatus 100A treats a first line (curve 82) and a second line (curve 84) as separate figures among the hysteresis curves drawn by the X component and the Y component of the magnetic flux density.

With this configuration, the estimation unit 114 estimates the angle $\theta$ by using a plurality of measured values of the X component or a plurality of measured values of the Y component of the magnetic sensor 30 in the first line, and the update unit 116 updates the reference information based on a shape of the first line. Similarly, the estimation unit 114 estimates the angle $\theta$ by using a plurality of measured values of the X component or a plurality of measured values of the Y component of the magnetic sensor 30 in the second line, and the update unit 116 updates the reference information based on a shape of the second line.

By performing at least one of a) expansion or reduction or b) movement on the figure indicating the correlation between the plurality of components of the magnetic flux density, the update unit 116 may align a plurality of predetermined feature points on the figure onto any of coordinate values indicated by each of the measured values of the X component and the measured values of the Y component which are measured by the magnetic sensor 30. The update unit 116 may update the reference information based on the figure obtained by this alignment.

When such a feature point is appropriately set, even if the apparatus 10A does not have the IMU, the estimation apparatus 100A of the present embodiment can accurately estimate the attitude of the second portion 12 with respect to the first portion 11 based on the measured value of the magnetic sensor 30. A configuration in which the apparatus 10A does not have an IMU reduces an installation area of the estimation apparatus 100A in the apparatus 10A, and also contributes to a reduction of manufacturing costs. Furthermore, since the apparatus 10A can execute the angle θ by only one type of the magnetic sensor 30, it suffices when the apparatus 10A no longer includes a configuration to achieve consistency between sensory data of the IMU and sensory data of the magnetic sensor 30.

Figure 8:
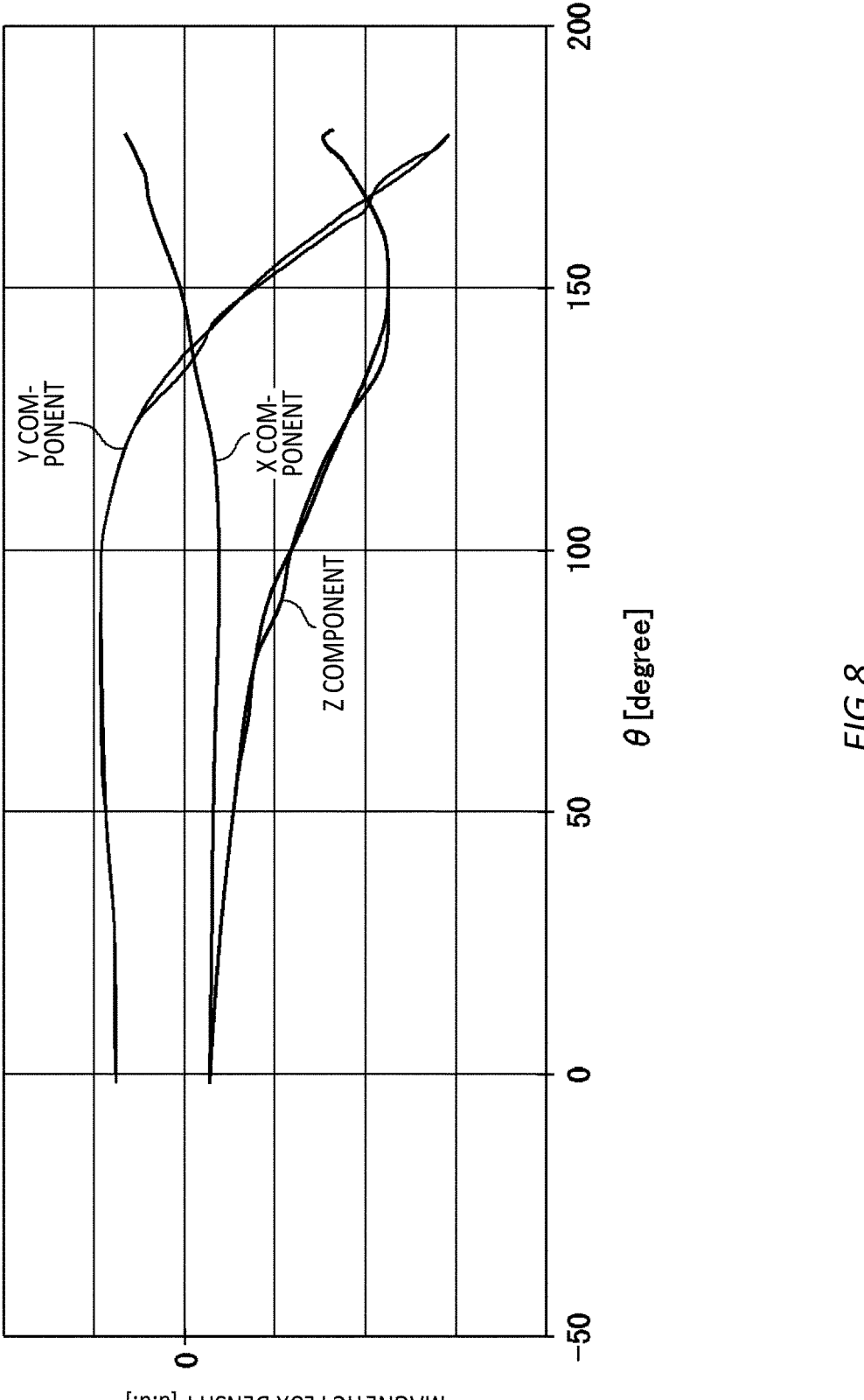
FIG. 8 illustrates another example of the magnetic flux density according to the angle $\theta$ between the first portion 11 and the second portion 12 which is detected by the magnetic sensor 30.

FIG. 8 illustrates another example of the magnetic flux density according to the angle θ between the first portion 11 and the second portion 12 which is detected by the magnetic sensor 30. The present embodiment is common to the embodiment of FIG. 1A to FIG. 7 in that the magnet section 20 is arranged in one of the first portion 11 or the second portion 12, and the magnetic sensor 30 is arranged in another of the first portion 11 or the second portion 12. However, since the relative position of the magnetic sensor 30 with respect to the magnet section 20 is different, a graph in which a horizontal axis represents the angle θ and a vertical axis represents the X component, the Y component, and the Z component of the magnetic flux density has a different manner of variation of the values and a different range of the values from those of embodiment of FIG. 1A to FIG. 7.

Figure 9:
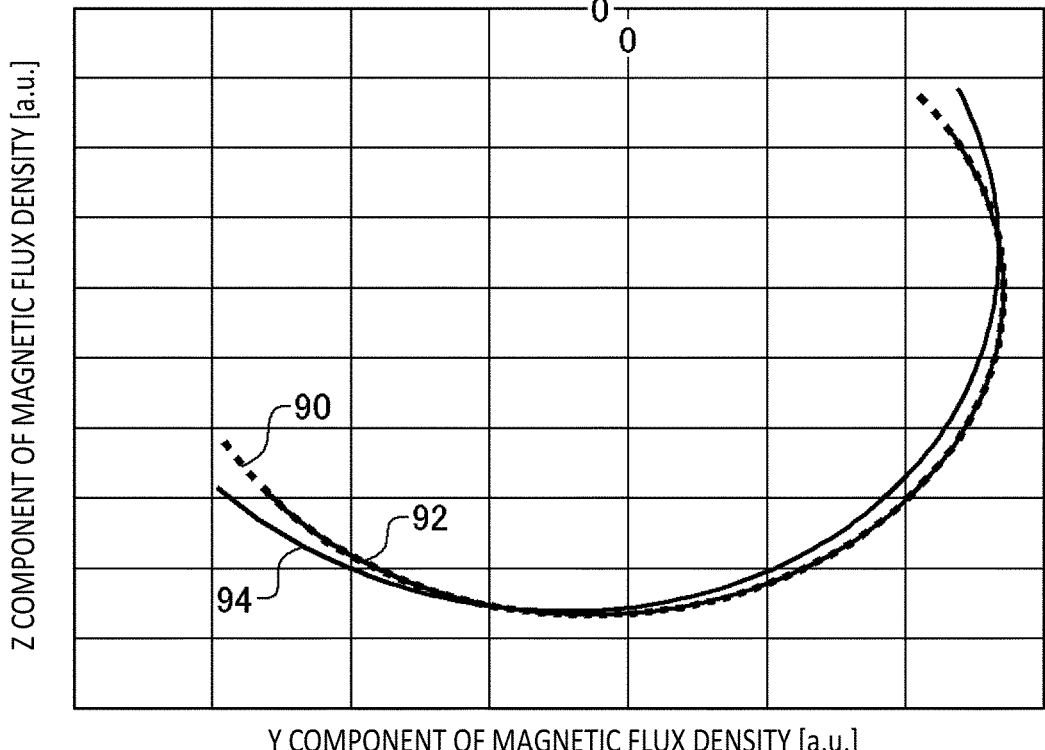
FIG. 9 illustrates an example of data at the time of calibration at a factory, data measured after shipment, and a curve obtained in such a manner that the data measured after the shipment is expanded or reduced and moved in parallel in an arrangement of the magnet section 20 and the magnetic sensor 30 in FIG. 8.

FIG. 9 illustrates an example of data at the time of calibration at a factory, data measured after shipment, and a curve obtained in such a manner that the data measured after the shipment is expanded or reduced and moved in parallel in an arrangement of the magnet section 20 and the magnetic sensor 30 in FIG. 8. In the drawing, a curve 90 linking data at the time of the calibration at the factory is indicated by a broken line, a curve 92 linking data measured after the shipment and a curve 94 obtained in such a manner that the data measured after the shipment is expanded or reduced and moved in parallel are indicated by solid lines.

When the data measured after the shipment is to be measured by the magnetic sensor 30, the measurement is performed by putting the apparatus 10A into the open state (θ=180 degrees) from the closed state (θ=0 degrees) and then putting the apparatus 10A into the closed state (θ=0 degrees) from the open state (θ=180 degrees). However, in the curve 92 illustrated in the drawing, the apparatus 10A does not reach θ=0 degrees and θ=180 degrees in actuality, and data in a case where the apparatus 10A turns around at an angle halfway (for example, data at the time of reaching θ=160 degrees from θ=20 degrees and then reaching θ=20 degrees from θ=160 degrees) is indicated.

The curve 94 obtained in such a manner that the curve 92 is expanded or reduced and moved in parallel has deviation in that a curvature is different with respect to the curve 90 linking the data at the time of the calibration at the factory. In particular, when the feature points include the two points of the end points indicating the open state and the closed state and when the end points are not true end points and points in the middle of the way of opening and closing are erroneously determined as the end points, even if the curve 92 is expanded or reduced and moved in parallel, it may not be possible to align the curve 94 and the curve 90. Even if the estimation unit 114 estimates the angle θ by using such a measured value, an estimated value of the angle θ is not accurate, and when the update unit 116 updates the reference information by using such a measured value, the updated reference information may also not be reasonable as the reference information which is then used by the estimation unit 114 to perform the estimation.

To avoid this, the update unit 116 of the present embodiment may determine whether to perform the update of the reference information based on a degree of coincidence between the figure obtained in such a manner that the figure (the curve 90) indicating the correlation is expanded or reduced and moved in parallel and the curve 92 linking the measured values, or a degree of coincidence between the curve 94 obtained in such a manner that the curve 92 linking the measured values illustrated in the drawing is expanded or reduced and moved in parallel and the figure (the curve 90) indicating the correlation. The update unit 116 may compare the curve with the figure, for example, to determine whether to update the update information based on whether a total sum of distances between the mutual feature points is a predetermined threshold or more (equivalent to a case where the degree of coincidence is low), or less than the threshold (equivalent to a case where the degree of coincidence is high). As another example, as the predetermined degree of coincidence, a number of feature points having a distance of a predetermined threshold or more may be used. It may be determined that the degree of coincidence is high when the number of feature points having the distance of the predetermined threshold or more is low, and determined that the degree of coincidence is low when the number of feature points having the distance of the predetermined threshold or more is high.

In this manner, by performing at least one of a) expansion or reduction or b) movement of the figure on the XY coordinate system, the update unit 116 aligns the figure to the measured value of the X component and the measured value of the Y component which are measured by the magnetic sensor 30, for example, during the first operation from the closed state to the open state or during the second operation from the open state to the closed state. The update unit 116 may determine whether this alignment is allowed to a predetermined degree of coincidence or more.

The update unit 116 may perform such processing that the reference information to be stored in the storage unit 120 is updated when the alignment is allowed to the predetermined degree of coincidence or more, and the update of the reference information to be stored in the storage unit 120 is not performed when the alignment is to result in less than the predetermined degree of coincidence. In this manner, when the erroneous detection of the end point is performed, the update unit 116 of the present embodiment regards such a measured value is an outlier, and does not update the reference information.

Accordingly, the estimation unit 114 can accurately perform the estimation of the angle θ based on the reasonable reference information considering the impact of magnetization or the like. As a result, the estimation apparatus 100A can avoid deterioration of an estimation accuracy of the angle θ due to erroneous extraction of the feature point.

Figure 10:
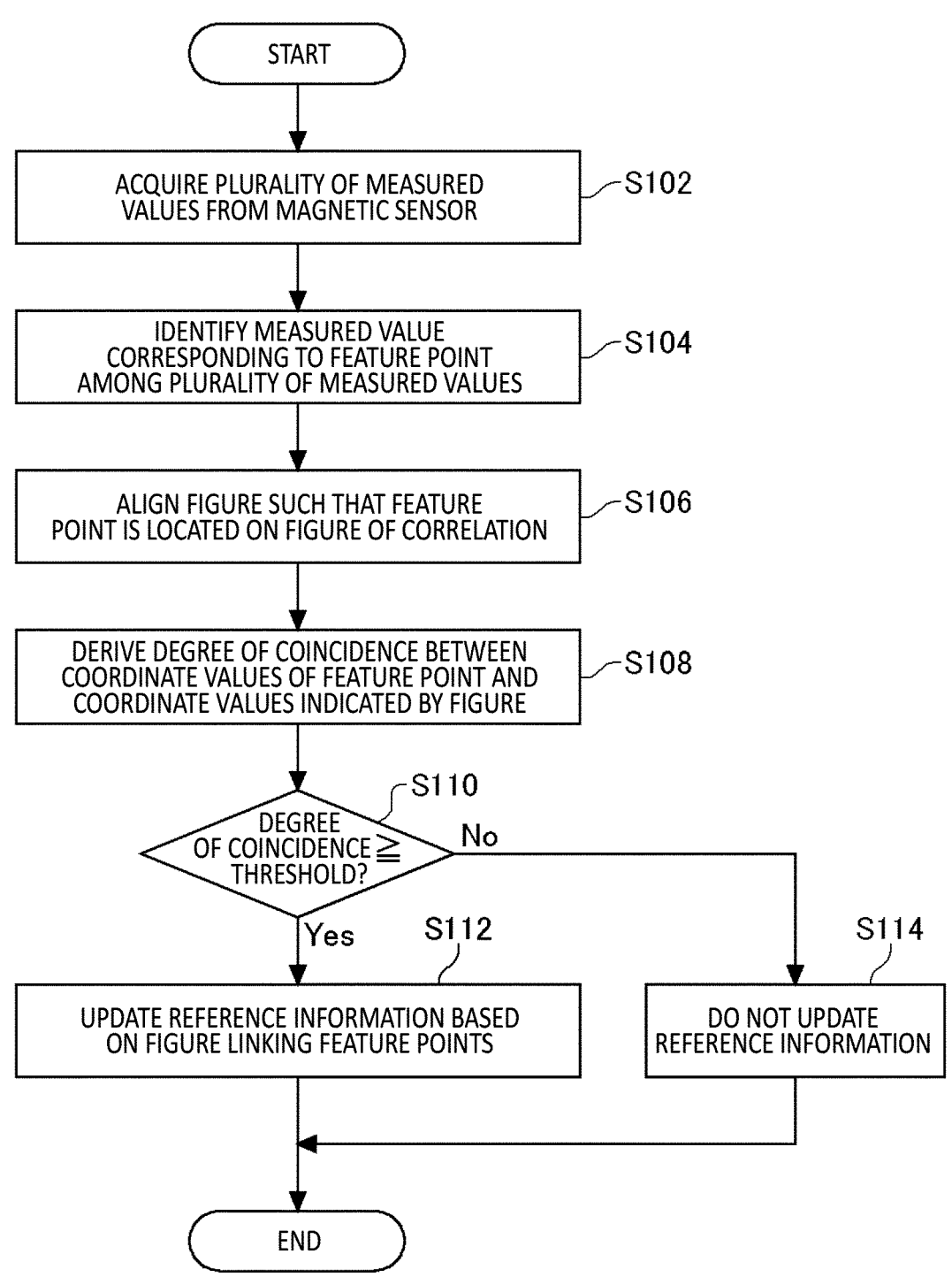
FIG. 10 illustrates an example of a flow diagram illustrating an update procedure of reference information used to estimate an attitude of a second portion 12 with respect to a first portion 11 in the apparatus 10A.

FIG. 10 illustrates an example of a flow diagram illustrating an update procedure of the reference information used to estimate the attitude of the second portion 12 with respect to the first portion 11 in the apparatus 10A. The update procedure includes each step from S102 to S114.

The acquisition unit 112 receives the measured value of the magnetic flux density (or the magnetic field) measured by the magnetic sensor 30 from the communication interface 130, and acquires the reference information from the storage unit 120 (S102). The estimation unit 114 identifies the figure of the correlation indicating the combination of the X component and the Y component of the magnetic flux density based on the acquired reference information. Furthermore, the estimation unit 114 identifies the measured value corresponding to the feature point on the figure indicating the correlation among the plurality of measured values based on the combination of the measured value of the X component and the measured value of the Y component which are measured by the magnetic sensor 30 and the correlation indicating the combination of the measured value of the X component and the measured value of the Y component (S104).

Then, the update unit 116 aligns the figure such that the measured value identified as the measured value corresponding to the feature point is positioned in coordinates on the figure obtained in such a manner that the figure indicating the correlation is expanded or reduced and moved in parallel (S106). Note that as already described above, the update unit 116 may perform at least one of expansion or reduction or movement on the curve linking the measured values to be aligned to the figure indicating the correlation, and may derive the transformation parameter indicating an expansion rate or a reduction rate and an amount of movement in the X axis direction and the Y axis direction at the time of the alignment.

The update unit 116 derives the degree of coincidence between coordinate values of the feature point and the figure expanded or reduced and moved in parallel (S108). The update unit 116 determines whether the derived degree of coincidence is a predetermined threshold or more, or less than the threshold (S110).

When the degree of coincidence is the threshold or more, the update unit 116 updates the reference information indicating the measured values of the X component and the Y component with respect to the angle θ based on the transformation parameter indicating the expansion rate or the reduction rate and the amount of movement in the X axis direction and the Y axis direction at the time of the alignment (S112). That is, the update unit 116 updates each of the measured value of the X component and the measured value of the Y component with respect to the angle θ indicated by the reference information according to the expansion rate or the reduction rate and the amount of movement in the X axis direction and the Y axis direction. When the degree of coincidence is less than the threshold, the update unit 116 does not update the reference information based on the transformation parameter (S116).

In the present embodiment, the description has been provided on the example in which the update unit 116 updates the reference information for estimating the angle θ indicating the attitude of the second portion 12 with respect to the first portion 11 by using the correlation of the measured value of the X component and the measured value of the Y component which are measured by the single magnetic sensor 30. However, when the apparatus 10A includes a plurality of magnetic sensors 30, the update unit 116 may update the reference information for estimating the angle θ indicating the attitude of the second portion 12 with respect to the first portion 11 by using a correlation of a measured value of the X component which is measured by one magnetic sensor 30 among the plurality of magnetic sensors 30 and a measured value of the X component which is measured by another magnetic sensor 30 among the plurality of magnetic sensors 30. Alternatively, the estimation unit 114 may update the reference information for estimating the angle θ indicating the attitude of the second portion 12 with respect to the first portion 11 by using a correlation of a measured value of the X component which is measured by one magnetic sensor 30 among the plurality of magnetic sensors 30 and a measured value of the Y component which is measured by another magnetic sensor 30 among the plurality of magnetic sensors 30.

The embodiment in which an apparatus 10 is the apparatus 10A that is a collapsible terminal has been described above. Hereinafter, an embodiment in which the apparatus 10 is an apparatus 10B that is an expandable terminal will be described.

Figure 11A:
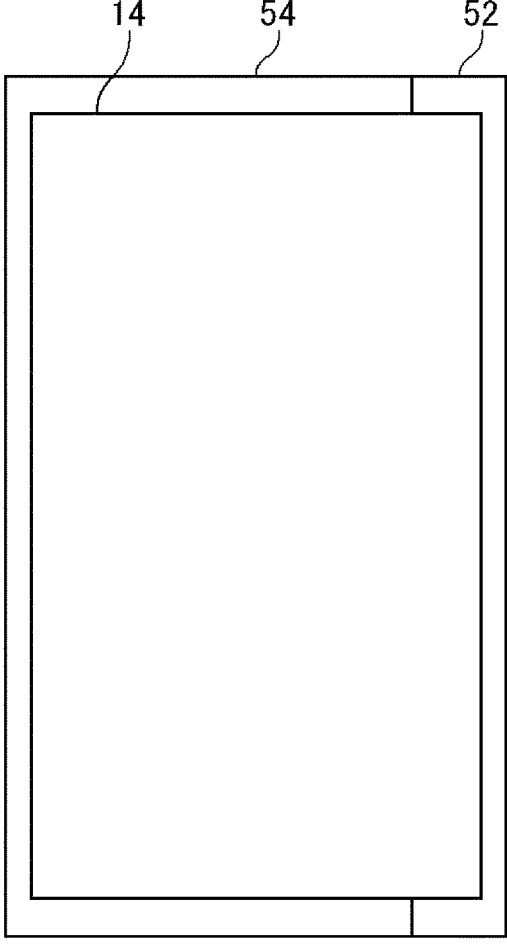
FIG. 11A illustrates an example of a top view of an external appearance in an apparatus 10B.
Figure 11A:
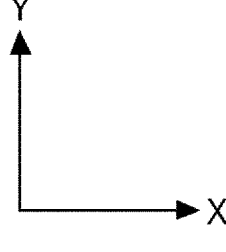
Figure 11B:
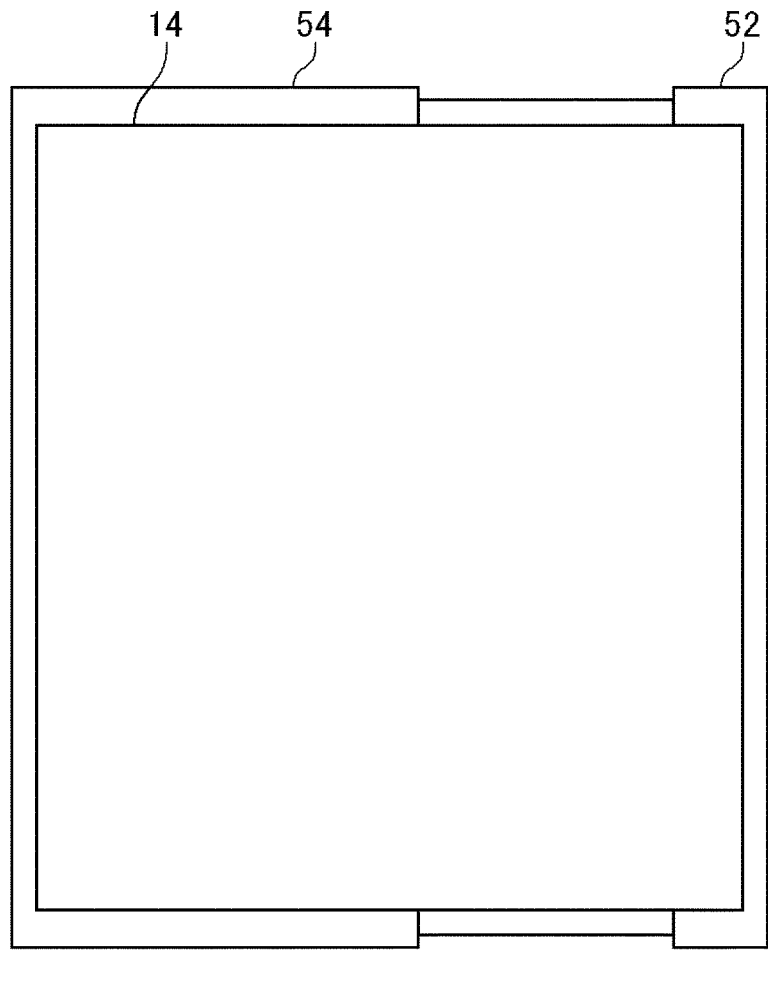
FIG. 11B illustrates another example of the top view of the external appearance in the apparatus 10B.
Figure 11B:
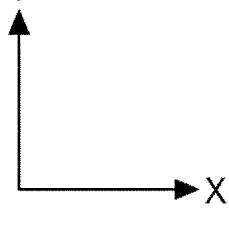
Figure 12:
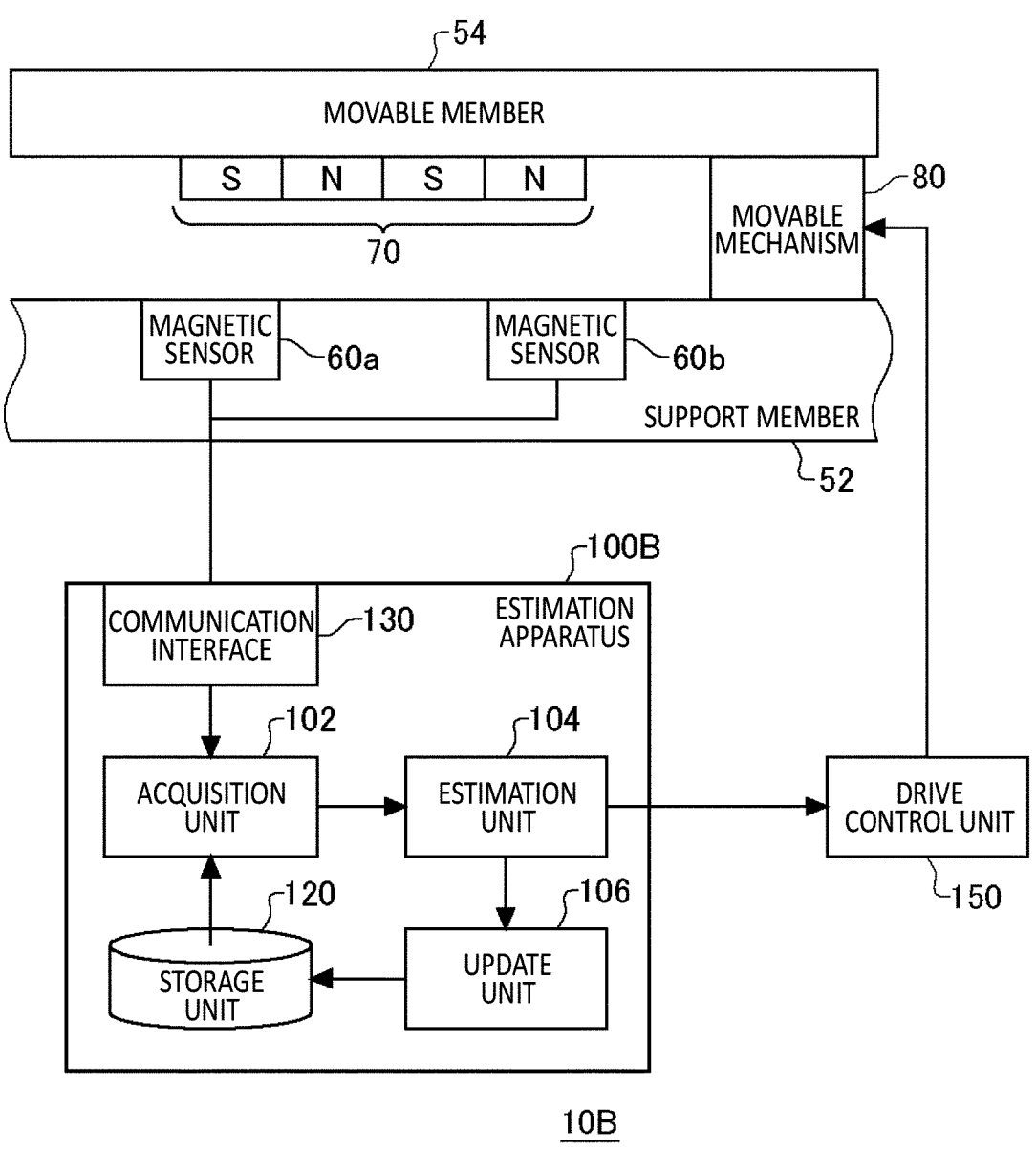
FIG. 12 illustrates an example of a functional block in the apparatus 10B.

With reference to FIG. 11A to FIG. 12, a configuration included in the apparatus 10B will be described. FIG. 11A illustrates an example of a top view of an external appearance of the apparatus 10B, and FIG. 11B illustrates another example of the top view of the external appearance of the apparatus 10B. FIG. 12 illustrates an example of a functional block of the apparatus 10B according to the present embodiment.

The apparatus 10B is an expandable terminal, and is a mobile terminal such as, for example, a smartphone, a mobile phone, a tablet, a laptop, and a small computer. FIG. 11A and FIG. 11B illustrate an example in which the apparatus 10B is a so-called rollable smartphone. The apparatus 10B includes a support member 52, a movable member 54, the display 14, and a movable mechanism 80.

As illustrated in FIG. 11A and FIG. 11B, for example, a display screen of the display 14 the apparatus 10B extends and contracts. The support member 52 and the movable member 54 may configure a display unit. The movable member 54 may move along an X axis direction from a first state illustrated in FIG. 11A to a second state illustrated in FIG. 11B with respect to the support member 52. With this configuration, a width in an X direction of the display screen of the display 14 extends and contracts. The display 14 may be, for example, a thin display such as an organic EL display that is allowed to be wound around a rotational axis along the Y axis when the movable mechanism 80 functions. The support member 52 is an example of a "first portion", and the movable member 54 is an example of a "second portion".

The movable mechanism 80 may have a driving source that provides a driving force to move the movable member 54 with respect to the support member 52. The driving source may be an electrostatic actuator, a voice coil motor (VCM), or an actuator such as a piezo actuator. A configuration may be adopted where the movable mechanism 80 does not have a driving source, and the movable member 54 may be moved manually via the movable mechanism 80 with respect to the support member 52.

Note that in the present embodiment, for ease of the description, the example has been illustrated in which the apparatus 10 has any of the hinge mechanism 16 or the movable mechanism 80, but the apparatus 10 may have both the hinge mechanism 16 and the movable mechanism 80. That is, the apparatus 10 may be, for example, a collapsible and expandable terminal like a smartphone using a slider hinge mechanism. Accordingly, the embodiment or part thereof with regard to the collapsible terminal described with reference to FIG. 1A to FIG. 10 may be combined with an embodiment or part thereof with regard to the expandable terminal described with reference to FIG. 11A and subsequent drawings. The embodiment described below can be applied to the measured value with respect to the translational movement and the rotational movement in a plurality of axial directions in an XYZ space of the movable member 54 with respect to the support member 52.

FIG. 11A illustrates a state in which the movable member 54 is most shortened with respect to the support member 52 in a movable range of the movable member. This is an example of a state in which the movable member 54 is in a "first position" with respect to the support member 52. Furthermore, FIG. 11B illustrates a state in which the movable member 54 is most extended with respect to the support member 52 in the movable range of the movable member. This is an example of a state in which the movable member 54 is in a "second position" with respect to the support member 52.

In this case, an operation for putting the movable member 54 from the "first position" into the "second position" with respect to the support member 52, that is, from the most shortened state into the most extended state is an example of the "first operation". On the other hand, an operation for putting the movable member 54 from the "second position" into the "first position" with respect to the support member 52, that is, from the most extended state into the most shortened state is an example of the "second operation".

As illustrated in FIG. 12, the apparatus 10B further includes a plurality of magnetic sensors 60a and 60b (which may be hereinafter collectively referred to as a magnetic sensor 60) and a magnet section 70. Similarly as in the magnetic sensor 30, the magnetic sensor 60 measures a magnetic field in a position in which the magnetic sensor 60 is provided, and outputs a measured value (for example, a voltage or a current) according to the magnetic field. The magnetic sensor 60 may be a Hall element.

In the present embodiment, an example will be described in which the apparatus 10B includes the two magnetic sensors 60a and 60b. However, the number of magnetic sensors 60 included in the apparatus 10B is optional, and it suffices when the apparatus 10B includes at least two magnetic sensors 60. It suffices when the apparatus 10B includes a required number of magnetic sensors 60 to estimate a position or an attitude of the movable member 54 with respect to the support member 52 in an entire movable range. The magnetic sensor 60 may output the measured value according to each magnetic field in the directions of the X axis, the Y axis, and the Z axis. However, to simplify the description in the present embodiment, the description will be provided where focus is on any one axis of the X axis, the Y axis, or the Z axis, for example, the measured value according to the magnetic field in the X axis direction. The magnetic sensor 60a is an example of a "first magnetic sensor", and the magnetic sensor 60b is an example of a "second magnetic sensor".

The magnet section 70 is configured to provide a magnetic field for each of the plurality of magnetic sensors 60. When the movable member 54 moves with respect to the support member 52, the magnet section 70 may have an S pole and an N pole alternately arranged along a predetermined direction in the movable member 54.

In this case, the plurality of magnetic sensors 60 may be provided in the support member 52 that is one of the support member 52 or the movable member 54, and the magnet section 70 may be provided in the movable member 54 that is another of the support member 52 or the movable member 54. It is noted however which of the plurality of magnetic sensors 60 or the magnet section 70 is provided in the support member 52 or the movable member 54 is not limited to this example, and it suffices when the plurality of magnetic sensor 60 can detect a relative position of the support member 52 or the movable member 54. Accordingly, the magnetic sensor 60 may be provided in the movable member 54, and the magnet section 70 may be provided in the support member 52.

When the movable member 54 moves along a predetermined direction with respect to the support member 52, the plurality of magnetic sensors 60 may be provided in the support member 52 along the predetermined direction. The plurality of magnetic sensors 60 may be provided in the support member 52 at an equal interval along the predetermined direction.

The apparatus 10B further includes an estimation apparatus 100B and a drive control unit 150. The estimation apparatus 100B estimates a position of the movable member 54 with respect to the support member 52 based on the measured value of each of the plurality of magnetic sensors 60. The drive control unit 150 may control the movable mechanism 80 based on the position of the movable member 54 with respect to the support member 52 which is estimated by the estimation apparatus 100B such that the position of the movable member 54 with respect to the support member 52 is to be in a target position.

The plurality of magnetic sensors 60 is configured to measure the surrounding magnetic field, and output the measured value indicating the magnitude of the surrounding magnetic field. The movable member 54 moves with respect to the support member 52, so that the surrounding magnetic field of each of the plurality of magnetic sensors 60 is varied. Accordingly, when a relationship between the measured value of each of the plurality of magnetic sensors 60 and the movable member 54 with respect to the support member 52 is found in advance, the estimation apparatus 100B can estimate the position of the movable member 54 with respect to the support member 52 from the measured value measured by each of the plurality of magnetic sensors 60.

Figure 13:
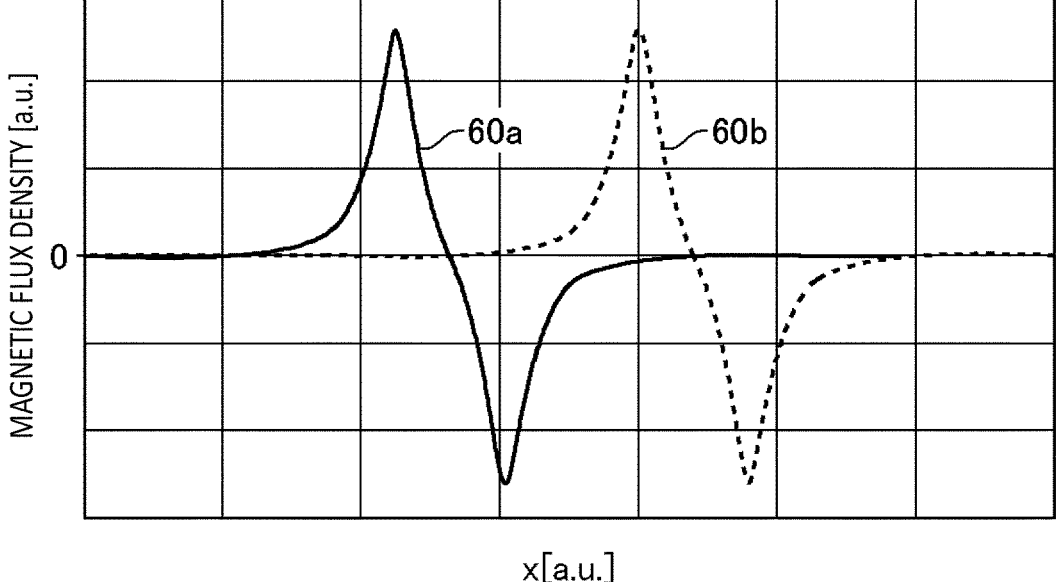
FIG. 13 illustrates an example of a relationship between a position in an X coordinate system of a movable member 54 with respect to a support member 52, and a measured value of each of two magnetic sensors 60a and 60b.

Then, with reference to FIG. 13 and FIG. 14, a principle will be described in which the reference information is acquired from the measured value measured by the magnetic sensor 60, and the position of the movable member 54 with respect to the support member 52 is estimated. FIG. 13 illustrates an example of a relationship between a position in an X coordinate system of the movable member 54 with respect to the support member 52 when the movable member 54 moves along a predetermined direction with respect to the support member 52 and the measured value of each of the two magnetic sensors 60a and 60b.

Curves drawn by the magnetic sensor 60a and the magnetic sensor 60b meet a fit function given by the following expression.

(Math. 1)

$$f(x) = A \exp\left(-\frac{(x - \bar{x})^2}{\sigma^2}\right) \tag{1}$$

The fit function is a predetermined function indicating variation of the measured value of the X component measured by the magnetic sensor 60a or the magnetic sensor 60b according to the position in the X coordinate system of the movable member 54 with respect to the support member 52. In the expression of the fit function, x denotes a position in the X direction.

(Math. 2)

$$\bar{x}$$

A symbol of Math. 2 denotes a position at a peak of the measured value of the magnetic flux density of each sensor in the X direction, and A denotes a height of the peak.

(Math. 2)

$$\bar{x}$$

The symbol of Math. 2 is a known parameter or a parameter which is readable from the measured value. A variable $\sigma$ is a specific coefficient indicating a width of a peak, and serves as a parameter which is varied due to an impact of magnetization to affect a decision on a position x.

Accordingly, by adjusting the variable $\sigma$, in a section in which the magnetic sensors 60a and 60b respond, the estimation apparatus 100 can estimate the position of the movable member 54 with respect to the support member 52 from the measured values of the magnetic sensors 60a and 60b.

Figure 14:
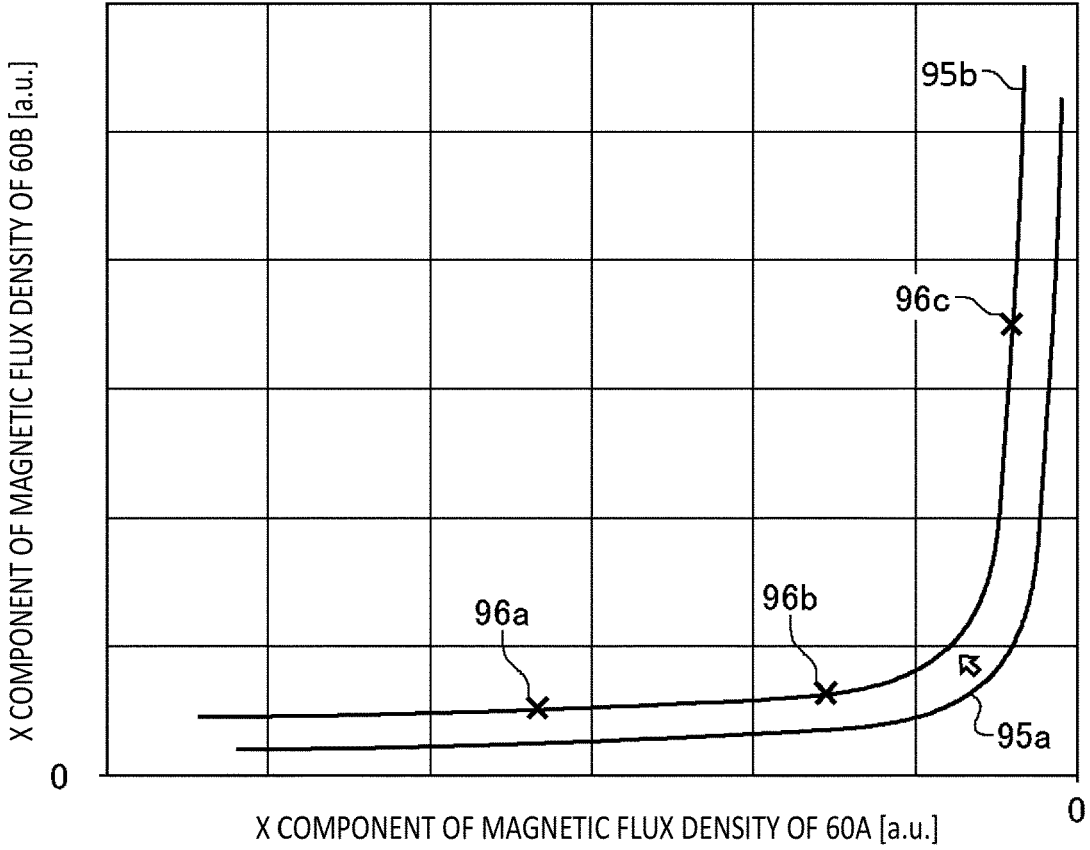
FIG. 14 is a diagram illustrating, while a measured value of an X component of the magnetic flux density by the magnetic sensor 60a and a measured value of an X component of the magnetic flux density by the magnetic sensor 60b are set as a horizontal axis and a vertical axis in a coordinate system, an example of a relationship of those combinations.

FIG. 14 is a diagram illustrating, while the measured value of the X component of the magnetic flux density by the magnetic sensor 60a and the measured value of the X component of the magnetic flux density by the magnetic sensor 60b are set as a horizontal axis and a vertical axis in a coordinate system, an example of a relationship of those combinations.

In this correlation, the geometric feature is not varied even in a case where the drive control unit 150 drives the movable mechanism 80 to non-uniformly move the movable member 54 in the X direction with respect to the support member 52, a case where a deviation of a driving direction from the X direction occurs, a case where the magnet section 70 and the magnetic sensor 60 experience an impact of magnetization due to a magnetic field of an external environment or the like, or other cases. When the variable $\sigma$ is varied, the curve indicating the relationship of this combination is shifted.

A curve 95a indicates a relationship of a combination of the measured value of the X component of the magnetic flux density by the magnetic sensor 60a and the measured value of the X component of the magnetic flux density by the magnetic sensor 60b when the variable $\sigma$ is a variable $\sigma_0$ which is set as a reference. The curve 95a indicates a relationship of a combination of measured values measured before shipment from the factory, for example.

In the drawing, three measured values 96a, 96b, and 96c in positions in the X direction are illustrated. The measured values 96a, 96b, and 96c indicate a relationship of a combination of the measured value of the X component of the magnetic flux density by the magnetic sensor 60a after the shipment from the factory and the measured value of the X component of the magnetic flux density by the magnetic sensor 60b. A curve 95b indicates a curve obtained in such a manner that the curve 95a is shifted so as to pass through the measured values 96a, 96b, and 96c. A shift amount for a shift from the curve 95a to the curve 95b is equivalent to a variation amount of the variable $\sigma$. Accordingly, the update unit 116 may update the variable $\sigma$ by multiplying the variable $\sigma_0$ set as the reference by a predetermined coefficient according to the shift amount.

The storage unit 120 may store, for each variable $\sigma$ with a different value, the relationship of the combination of the measured value of the X component of the magnetic flux density by the magnetic sensor 60a and the measured value of the X component of the magnetic flux density by the magnetic sensor 60b like the curve 95a and the curve 95b. In this case, the update unit 116 may update the variable $\sigma$ by identifying a relationship of the combination that has the highest degree of coincidence with the relationship of the combination of the plurality of measured values of the X component of the magnetic flux density by the magnetic sensor 60a and the plurality of measured values of the X component of the magnetic flux density by the magnetic sensor 60b after the shipment from the factory from among the relationships of the combinations stored in the storage unit 120, and replacing the current variable $\sigma$ with the variable $\sigma$ corresponding to the identified relationship of the combination.

Accordingly, with use of several measured values of the magnetic sensors 60a and 60b, the estimation apparatus 100B can identify a value of the variable $\sigma$ by identifying a shift position of the curve of the correlation or identifying a coefficient for multiplying numeric values in a table indicating coordinate values of the correlation by a specific scale. Alternatively, the estimation apparatus 100B can identify the value of the variable $\sigma$ by identifying the relationship of the combination which matches several measured values of the magnetic sensors 60a and 60b from among relationships of combinations predetermined for each size of the variable $\sigma$. The estimation apparatus 100B adjusts the fit function based on the identified variable $\sigma$. According to the adjusted fit function, the estimation apparatus 100B can estimate the position in the X direction of the movable member 54 with respect to the support member 52 in the section in which the magnetic sensors 60a and 60b respond.

These fit functions of Expression 1 in the X direction and the combination of the X components of the measured values of the magnetic sensors 60a and 60b in the fit functions constitute the reference information. The estimation apparatus 100B updates the value of the variable $\sigma$ that is a coefficient in the fit function based on the correlation of the measured values of the X component of the magnetic flux density measured by the magnetic sensors 60a and 60b with respect to the relationship of the combination of the plurality of magnetic sensors 60a and 60b which do not experience the impact of magnetization. With this configuration, according to the fit function adjusted by the variable $\sigma$ after the update, the estimation apparatus 100B can accurately estimate the position in the X direction of the movable member 54 with respect to the support member 52 in the section in which the plurality of magnetic sensors 60a and 60b responds.

With reference to FIG. 12 again, a functionality and a configuration of the estimation apparatus 100B will be described. The estimation apparatus 100B includes the communication interface 130, the storage unit 120, an acquisition unit 102, an estimation unit 104, and an update unit 106.

The communication interface 130 communicates with a plurality of magnetic sensors 60 via a signal line, and receives measured values of the magnetic flux densities measured by the plurality of magnetic sensors 60. The communication interface 130 may receive each component in the XYZ coordinate system of the magnetic flux densities measured by the plurality of magnetic sensors 60.

The storage unit 120 stores the reference information for estimating the position of the movable member 54 with respect to the support member 52 from the measured values in the plurality of magnetic sensors 60 including the magnetic sensors 60a and 60b. Specifically, the reference information includes a fit function mutually met by the plurality of magnetic sensors 60.

The acquisition unit 102 receives the measured values of the magnetic flux densities (or the magnetic fields) measured by the plurality of magnetic sensors 60 from the communication interface 130, and acquires the reference information from the storage unit 120. The acquisition unit 102 transmits the acquired measured values of the plurality of magnetic sensors 60 and the reference information to the estimation unit 104.

The estimation unit 104 estimates the position in the X direction of the movable member 54 (the second portion 12) with respect to the support member 52 (the first portion 11) based on the combination of the measured values of the X component measured by the plurality of magnetic sensors 60, and the reference information indicating the combination of the measured values of the X component measured by the plurality of magnetic sensors 60. As already described above, in the present embodiment, the reference information may be the fit functions of Math. 1 and the combination of the X components of the measured values of the magnetic sensors 60a and 60b in the fit functions.

The update unit 106 updates the reference information represented by the fit function according to the variable $\sigma$ stored in the storage unit 120 based on each correlation between the plurality of measured values of the X component measured by the magnetic sensor 60a and the plurality of measured values of the X component measured by the magnetic sensor 60b in the magnetic flux density (or the magnetic field) measured by the magnetic sensor 60. The update unit 106 may update the reference information by adjusting the variable $\sigma$ that is a coefficient appearing in a predetermined fit function with respect to the magnetic sensor 60.

Herein, the update unit 106 may update the reference information represented by the fit function according to the variable $\sigma$ based on the correlation of the plurality of measured values of the X component measured by the magnetic sensor 60a and the plurality of measured values of the X component measured by the magnetic sensor 60b during at least part of at least one of the first operation or the second operation. For example, the update unit 106 may update the reference information represented by the fit function according to the variable $\sigma$ based on the correlation of the plurality of measured values of the X component measured by the magnetic sensor 60a and the plurality of measured values of the X component measured by the magnetic sensor 60b during part of the first operation or the second operation. The update unit 106 may update the reference information represented by the fit function according to the variable $\sigma$ based on the correlation of the plurality of measured value of the X component measured by the magnetic sensor 60a and the plurality of measured value of the X component measured by the magnetic sensor 60b during looping-back part between the first operation and the second operation. In addition, the update unit 106 may update the reference information represented by the fit function according to the variable $\sigma$ based on the correlation of the measured value of the X component measured by the magnetic sensor 60a and the measured value of the X component measured by the magnetic sensor 60b when the movable member 54 is in the first position with respect to the support member 52, and the correlation of the measured value of the X component measured by the magnetic sensor 60a and the measured value of the X component measured by the magnetic sensor 60b when the movable member 54 is in the second position with respect to the support member 52.

Figure 15:
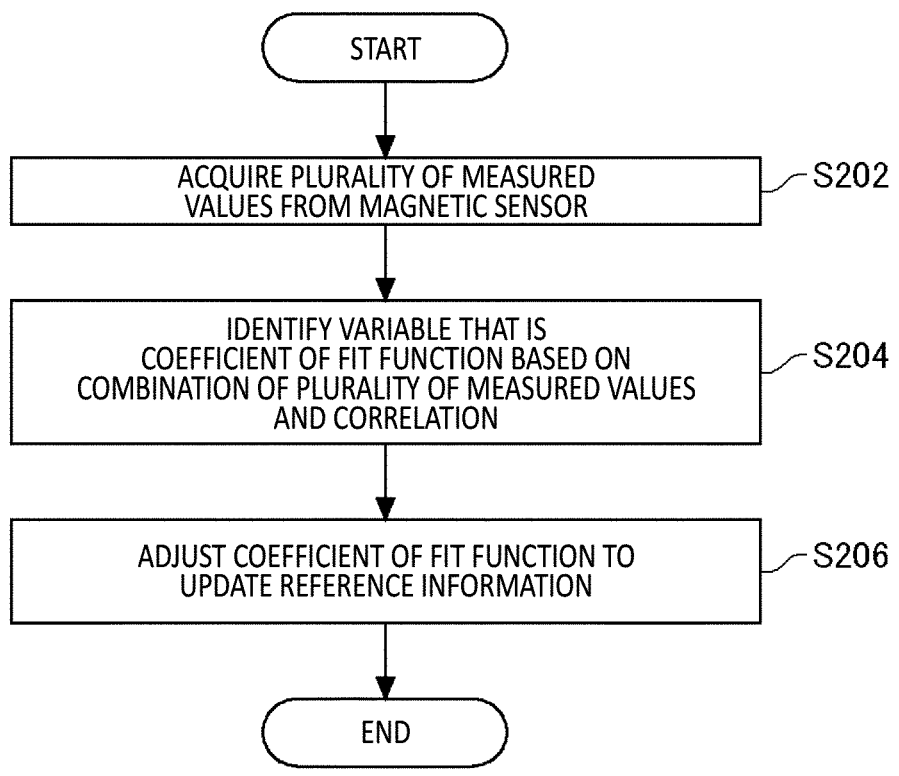
FIG. 15 illustrates an example of a flow diagram illustrating an update procedure of reference information used to estimate a position of the movable member 54 with respect to the support member 52 in the apparatus 10B.

FIG. 15 illustrates an example of a flow diagram illustrating an update procedure of the reference information to be used to estimate a position of the movable member 54 (the second portion 12) with respect to the support member 52 (the first portion 11) in the apparatus 10B. The update procedure includes each step from S202 to S206.

The acquisition unit 102 receives the measured values of the magnetic flux density (or magnetic field) measured by the plurality of magnetic sensors 60 from the communication interface 130 (S202). The update unit 106 shifts the curve of the reference indicating the correlation of the combination of the measured values (for example, the curve 95a of FIG. 14) so as to match the measured values (for example, the measured values 96a, 96b, and 96c) of the magnetic flux densities measured by the plurality of magnetic sensors 60, and identifies a shift amount thereof. Furthermore, the update unit 106 identifies the variable $\sigma$ that is a coefficient of the fit function by multiplying the variable $\sigma_0$ of the reference by a predetermined coefficient according to the shift amount (S204). Alternatively, the update unit 106 may identify a relationship of the combination that has the highest degree of coincidence with the relationship of the combination of the measured values of the magnetic flux densities measured by the plurality of magnetic sensors 60 from among the relationships of the combinations stored in the storage unit 120, and identify the variable $\sigma$ that is a coefficient of the fit function by replacing the current variable $\sigma$ with the variable $\sigma$ corresponding to the identified relationship of the combination. The update unit 106 adjusts the variable $\sigma$ that is a coefficient of the fit function to update the reference information (S206).

With this configuration, it is possible to provide an estimation method for an accurate position of the movable member 54 with respect to the support member 52 with which calibration is allowed with respect to an impact of an external magnetic field or the like by using the plurality of magnetic sensors 60a and 60b inexpensively without use of the IMU or the like.

In the present embodiment, the example has been described in which the update unit 106 updates the reference information of the measured value by the plurality of magnetic sensors 60a and 60b in the position of the movable member 54 with respect to the support member 52 by using the correlation of the measured values of the X components of the respective magnetic fields measured by the magnetic sensors 60a and 60b. However, the update unit 106 may update the reference information for estimating the position of the movable member 54 with respect to the support member 52 by using the correlation of the measured values in different axial directions of the magnetic fields measured by the plurality of magnetic sensors 60a and 60b. For example, the update unit 106 may update the reference information for estimating the position of the movable member 54 with respect to the support member 52 by using the correlation of the measured value of the X component of the magnetic field measured by the magnetic sensor 60a and the measured value of the Y component of the magnetic field measured by the magnetic sensor 60b. The update unit 106 may update the reference information for estimating the position of the movable member 54 with respect to the support member 52 by using the correlation of the measured value of the X component and the measured value of the Y component of the magnetic field measured by the single magnetic sensor 60a.

The apparatus 10B may include a plurality of magnetic sensors 60 for each of a plurality of axes for translational movement of the movable member 54 with respect to the support member 52. For example, by combining a plurality of slide mechanisms, after the movable member 54 is pulled out with respect to the support member 52, the apparatus 10B may be an apparatus which can change the relationship for overlapping the movable members 54 or arranging the movable member 54 in a planar positional relationship with respect to the support member 52. Since the apparatus 10B is provided with the plurality of magnetic sensors 60, it is facilitated for the estimation unit 104 to estimate the exact position with regard to the translational movement in the XYZ space of the movable member 54 with respect to the support member 52.

Figure 16:
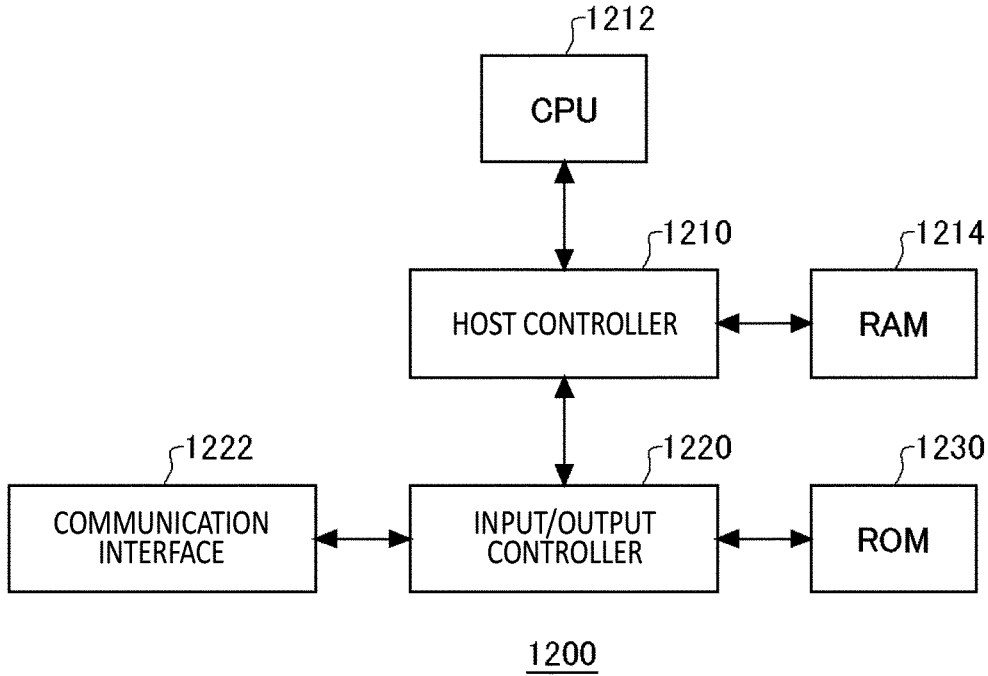
FIG. 16 illustrates an example of a hardware configuration in which a plurality of aspects of the present invention are embodied.

FIG. 16 illustrates an example of a computer 1200 in which a plurality of embodiments of the present invention may be entirely or partially embodied. Programs installed in the computer 1200 can cause the computer 1200 to function as operations associated with the apparatus according to the embodiments of the present invention or one or more "units" of the apparatuses. Alternatively, the programs can cause the computer 1200 to execute the operations or the one or more "units". The programs can cause the computer 1200 to execute a process according to the embodiments of the present invention or steps of the process. Such programs may be executed by a CPU 1212 to cause the computer 1200 to perform specific operations associated with some or all of the blocks in the flowcharts and block diagrams described in the present specification.

The computer 1200 according to the present embodiment includes the CPU 1212 and a RAM 1214, which are mutually connected by a host controller 1210. The computer 1200 also includes a communication interface 1222 and an input/output unit, which are connected to the host controller 1210 via an input/output controller 1220. The computer 1200 also includes a ROM 1230. The CPU 1212 operates according to the programs stored in the ROM 1230 and the RAM 1214, thereby controlling each unit.

The communication interface 1222 communicates with other electronic devices via a network. A hard disk drive may store the programs and data used by the CPU 1212 in the computer 1200. The ROM 1230 stores therein boot programs or the like executed by the computer 1200 at the time of activation, and/or stores programs depending on hardware of the computer 1200. The programs are provided via a computer readable storage medium such as CR-ROM, a USB memory or an IC Card or a network. The programs are installed on the RAM 1214, which also is an example of the computer readable storage medium, or the ROM 1230 and performed by the CPU 1212. Information processing written in these programs is read by the computer 1200, and provides cooperation between the programs and the various types of hardware resources described above. An apparatus or a method may be configured by implementing operations or processing of information according to a use of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a medium such as the RAM 1214 or a USB memory and transmits the read transmission data to a network or writes reception data received from a network to a reception buffer region or the like provided on the storage medium.

Also, the CPU 1212 may cause the whole or required part of files which are stored in the external storage media (such as USB memory) or the database to be read by the RAM 1214, to perform a various type of processes for the data on the RAM 1214. Then, the CPU 1212 may write back the processed data to the external storage media.

A various type of information such as a various type of programs, data, tables and databases may be stored in a storage media to undergo an information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. Also, the CPU 1212 may retrieve information in the file, database or the like in the storage media. For example, when a plurality of entries each having an attribute value of the first attribute associated with an attribute value of the second attribute are stored in a storage media, the CPU 1212 may retrieve, among the plurality of entries, an entry whose attribute value of the first attribute is specified and matches the conditions and read the attribute value of the second attribute stored in the entry, thereby acquiring the attribute value of the second attribute associated with the first attribute which satisfies a predetermined condition.

The programs or software module described above may be stored on the computer 1200 or in a computer readable storage medium near the computer 1200. In addition, a storage medium such as a hard disk or a RAM provided in a server system connected in a wired or wireless manner to a dedicated communication network or the Internet can be used as the computer readable storage medium, thereby providing the program to the computer 1200 via the network.

A computer readable medium may include any tangible device that can store instructions to be executed by a suitable device. As a result, the computer readable medium having instructions stored therein includes an article of manufacture including instructions which can be executed in order to create means for performing operations specified in the flowcharts or block diagrams. Examples of the computer readable medium may include an electronic storage medium, a magnetic storage medium, an optical storage medium, an electromagnetic storage medium, a semiconductor storage medium, and the like. More specific examples of the computer readable medium may include a floppy disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

A computer readable instruction may include either a source code or an object code described in any combination of one or more programming languages. The source code or the object code includes a conventional procedural programming language. The conventional procedural programming language may be assembler instructions, instruction-set-architecture (ISA) instructions, machine instructions, machine dependent instructions, microcode, firmware instructions, state-setting data, or an object oriented programming language such as Smalltalk (registered trademark), JAVA (registered trademark), C++, etc., and programming languages, such as the "C" programming language or similar programming languages. Computer readable instructions may be provided to a processor of a general purpose computer, special purpose computer, or other programmable data processing device, or to programmable circuitry, locally or via a local area network (LAN), a wide area network (WAN) such as the Internet, etc. The processor or the programmable circuitry may execute the computer readable instructions in order to create means for performing operations specified in the flowcharts or block diagrams. Examples of the processor include a computer processor, a processing unit, a microprocessor, a digital signal processor, a controller, a microcontroller, and the like.

While the present invention has been described above by using the embodiments, the technical scope of the present invention is not limited to the scope of the above described embodiments. It is apparent to persons skilled in the art that various alterations or improvements can be made to the above described embodiments. It is also apparent from description of the claims that the embodiments to which such alterations or improvements are made can be included in the technical scope of the present invention.

It should be noted that the operations, procedures, steps, stages, etc. of each process performed by an apparatus, system, program, and method illustrated in the claims, specification, or diagrams can be performed in any order as long as the order is not indicated by "prior to," "before," or the like and as long as the output from a previous process is not used in a later process. Even if the operational flow is described by using phrases such as "first" or "next" in the claims, specification, or diagrams, it does not necessarily mean that the process must be performed in this order.

EXPLANATION OF REFERENCES

10: apparatus;
11: first portion;
12: second portion;
14: display;
16: hinge mechanism;
18: rotational axis;
20, 70: magnet section;
30, 60: magnetic sensor;
52: support member;
54: movable member;
80: movable mechanism;
82, 84, 90, 92, 94, 95: curve;
96: measured value;
100: estimation apparatus;
102, 112: acquisition unit;
104, 114: estimation unit;
106, 116: update unit;
110: control unit;
120: storage unit;
130, 1222: communication interface;
150: drive control unit;
1200: computer;
1210: host controller;
1212: CPU;
1214: RAM;
1220: input/output controller;
1230: ROM.

What is claimed is:

1. An estimation apparatus that estimates at least one of a position or an attitude of a second portion with respect to a first portion in an apparatus including the first portion, the second portion, a movable mechanism which changes at least one of the position or the attitude of the second portion with respect to the first portion, at least one magnetic sensor provided in one of the first portion or the second portion, and a magnet section which is provided in another of the first portion or the second portion and which provides a magnetic field measured by the at least one magnetic sensor, the estimation apparatus comprising:

one or more processors, wherein
the one or more processors:
estimate, based on a measured value of at least one component in at least one direction measured by the at least one magnetic sensor at a first time point and reference information indicating a measured value of at least one component in at least one direction of the at least one magnetic sensor according to a position or an attitude of the second portion with respect to the first portion, a position or an attitude of the second portion with respect to the first portion at the first time point; and
update the reference information based on a correlation of measured values of at least two components in the at least one direction measured by the at least one magnetic sensor.

2. The estimation apparatus according to claim 1, wherein the movable mechanism allows a first operation that causes the second portion to change from a first position or a first attitude to a second position or a second attitude with respect to the first portion, and a second operation that causes the second portion to change from the second position or the second attitude to the first position or the first attitude with respect to the first portion, and the one or more processors update the reference information based on the correlation of the measured values of the at least two components in the at least one direction measured by the at least one magnetic sensor during at least part of at least one of the first operation or the second operation.

3. The estimation apparatus according to claim 2, wherein the one or more processors update the reference information based on the correlation of the measured values of the at least two components in the at least one direction measured by the at least one magnetic sensor when the second portion is in the first position or the first attitude with respect to the first portion, or the correlation of the measured values of the at least two components in the at least one direction measured by the at least one magnetic sensor when the second portion is in the second position or the second attitude with respect to the first portion.

4. The estimation apparatus according to claim 1, wherein on a coordinate system in which a first axis represents a measured value of a component in a first direction which is measured by the at least one magnetic sensor and a second axis represents a measured value of a component in a second direction which is measured by the at least one magnetic sensor, the correlation is represented by a figure indicated by a set of coordinate values corresponding to the position or the attitude of the second portion with respect to the first portion which is indicated by a combination of the measured value of the component in the first direction which is measured by the at least one magnetic sensor and the measured value of the component in the second direction which is measured by the at least one magnetic sensor, and the one or more processors update the reference information by performing at least one of a) expansion or reduction or b) movement to align the figure on the coordinate system onto coordinate values respectively indicated by a plurality of measured values of the component in the first direction and a plurality of measured values of the component in the second direction which are measured by the at least one magnetic sensor.

5. The estimation apparatus according to claim 4, wherein the movable mechanism allows a first operation that causes the second portion to change from a first position or a first attitude to a second position or a second attitude with respect to the first portion, and a second operation that causes the second portion to change from the second position or the second attitude to the first position or the first attitude with respect to the first portion, the correlation includes a first combination group of the measured value of the component in the first direction and the measured value of the component in the second direction which are measured by the at least one magnetic sensor according to the position or the attitude of the second portion with respect to the first portion during the first operation, and a second combination group of the measured value of the component in the first direction and the measured value of the component in the second direction which are measured by the at least one magnetic sensor according to the position or the attitude of the second portion with respect to the first portion during the second operation, and the figure includes a first line corresponding to the first combination group and a second line corresponding to the second combination group.

6. The estimation apparatus according to claim 4, wherein the one or more processors update the reference information by performing at least one of a) the expansion or the reduction or b) the movement of the figure on the coordinate system to align a predetermined feature point on the figure to any of coordinate values respectively indicated by the plurality of measured values of the component in the first direction and the plurality of measured values of the component in the second direction which are measured by the at least one magnetic sensor.

7. The estimation apparatus according to claim 6, wherein the predetermined feature point on the figure includes a point at which the component of the first axis becomes maximum or minimum, and a point at which the component of the second axis becomes maximum or minimum.

8. The estimation apparatus according to claim 4, wherein the movable mechanism allows a first operation that causes the second portion to change from a first position or a first attitude to a second position or a second attitude with respect to the first portion, and a second operation that causes the second portion to change from the second position or the second attitude to the first position or the first attitude with respect to the first portion, and the one or more processors does not update the reference information when it is not possible to align, by performing at least one of a) expansion or reduction or b) movement, the figure on the coordinate system onto the coordinate values respectively indicated by the plurality of measured values of the component in the first direction and the plurality of measured values of the component in the second direction which are measured by the at least one magnetic sensor during the first operation or during the second operation to a predetermined degree of coincidence or more.

9. The estimation apparatus according to claim 1, wherein the reference information is represented by each of predetermined fit functions indicating variation of the measured value of the at least one component in the at least one direction of the at least one magnetic sensor according to the position or the attitude of the second portion with respect to the first portion, and the one or more processors update the reference information by adjusting a specific coefficient of each of the predetermined fit functions based on the correlation of the measured values of the at least two components in the at least one direction measured by the at least one magnetic sensor.

10. An apparatus comprising:
the estimation apparatus according to claim 1;
the first portion;
the second portion; and
the movable mechanism.

11. An estimation method of estimating at least one of a position or an attitude of a second portion with respect to a first portion in an apparatus including the first portion, the second portion, a movable mechanism which changes at least one of the position or the attitude of the second portion with respect to the first portion, at least one magnetic sensor provided in one of the first portion or the second portion, and a magnet section which is provided in another of the first portion or the second portion and which provides a magnetic field measured by the at least one magnetic sensor, the estimation method comprising:

estimating, based on a measured value of at least one component in at least one direction measured by the at least one magnetic sensor at a first time point and reference information indicating a measured value of at least one component in at least one direction of the at least one magnetic sensor according to a position or an attitude of the second portion with respect to the first portion, a position or an attitude of the second portion with respect to the first portion at the first time point; and updating the reference information based on a correlation of measured values of at least two components in the at least one direction measured by the at least one magnetic sensor.

12. A non-transitory computer readable storage medium storing a program for casing a computer to function as an estimation apparatus for estimating at least one of a position or an attitude of a second portion with respect to a first portion in an apparatus including the first portion, the second portion, a movable mechanism which changes at least one of the position or the attitude of the second portion with respect to the first portion, at least one magnetic sensor provided in one of the first portion or the second portion, and a magnet section which is provided in another of the first portion or the second portion and which provides a magnetic field measured by the at least one magnetic sensor, the program causing the computer to execute:

estimating, based on a measured value of at least one component in at least one direction measured by the at least one magnetic sensor at a first time point and reference information indicating a measured value of at least one component in at least one direction of the at least one magnetic sensor according to a position or an attitude of the second portion with respect to the first portion, a position or an attitude of the second portion with respect to the first portion at the first time point; and updating the reference information based on a correlation of measured values of at least two components in the at least one direction measured by the at least one magnetic sensor.

\* \* \* \* \*